United States Patent
Odle et al.

(10) Patent No.: US 11,286,347 B2
(45) Date of Patent: Mar. 29, 2022

(54) COMPOSITIONS AND ARTICLES MADE FROM BRANCHED POLYETHERIMIDES

(71) Applicant: SABIC GLOBAL TECHNOLOGIES B.V., Bergen op Zoom (NL)

(72) Inventors: Roy Ray Odle, Mt. Vernon, IN (US); Peter Johnson, Mt. Vernon, IN (US); Manojkumar Chellamuthu, Mt. Vernon, IN (US); Hee Won Kong, Mt. Vernon, IN (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 317 days.

(21) Appl. No.: 16/472,150

(22) PCT Filed: Dec. 29, 2017

(86) PCT No.: PCT/US2017/068998
§ 371 (c)(1),
(2) Date: Jun. 20, 2019

(87) PCT Pub. No.: WO2018/126162
PCT Pub. Date: Jul. 5, 2018

(65) Prior Publication Data
US 2020/0115502 A1    Apr. 16, 2020

Related U.S. Application Data

(60) Provisional application No. 62/441,226, filed on Dec. 31, 2016.

(51) Int. Cl.
C08G 73/10    (2006.01)
C08L 79/08    (2006.01)
C08G 73/12    (2006.01)

(52) U.S. Cl.
CPC ....... *C08G 73/1071* (2013.01); *C08G 73/101* (2013.01); *C08G 73/1007* (2013.01); *C08G 73/1046* (2013.01); *C08G 73/122* (2013.01); *C08L 79/08* (2013.01); *C08L 2203/12* (2013.01); *C08L 2203/14* (2013.01); *C08L 2205/025* (2013.01); *C08L 2205/03* (2013.01)

(58) Field of Classification Search
CPC ... C08L 77/06; C08J 2379/08; C08J 2300/20; C09D 177/06; C08G 73/10
See application file for complete search history.

(56) References Cited

U.S. PATENT DOCUMENTS

| | | |
|---|---|---|
| 4,433,131 A | 2/1984 | Bolon et al. |
| 4,980,389 A | 12/1990 | Hill et al. |
| 6,262,223 B1 | 7/2001 | Meador et al. |
| 8,546,614 B1 | 10/2013 | Tan et al. |
| 8,962,890 B1 | 2/2015 | Tan et al. |
| 2007/0299188 A1 | 12/2007 | Chan et al. |
| 2010/0316877 A1 | 12/2010 | Song et al. |
| 2014/0094535 A1 | 4/2014 | Guggenheim et al. |
| 2017/0121483 A1* | 5/2017 | Poe .......... C08G 73/10 |

FOREIGN PATENT DOCUMENTS

| | | | |
|---|---|---|---|
| CN | 103059298 A | | 4/2013 |
| CN | 104039867 A | | 9/2014 |
| CN | 104204036 A | | 12/2014 |
| CN | 105085913 A | | 11/2015 |
| CN | 106009017 A | | 10/2016 |
| JP | 2014-114328 | * | 6/2014 |
| JP | 2014114328 A1 | | 6/2014 |
| JP | 2015-108062 | * | 6/2015 |
| JP | 2015108062 A | | 6/2015 |
| WO | 2012133744 A1 | | 10/2012 |

OTHER PUBLICATIONS

He et al., "Preparation of Novel, High Modulus, Swollen- or Jungle-Gym-Type Polyimide Gels End-Crosslinked with 1, 3, 5-Tris(4-aminophenyl) Benzene," Journal of Polymer Science: Part A: Polymer Chemistry, vol. 40, 2501-2512 (2002); 12 pages.
International Preliminary Report on Patentability; International Application No. PCT/US2017/068966; International Filing Date—Dec. 29, 2017; dated Apr. 12, 2019; 27 pages.
International Preliminary Report on Patentability; International Application No. PCT/US2017/068984 International Filing Date—Dec. 29, 2017; dated Apr. 10, 2019; 31 pages.

(Continued)

*Primary Examiner* — Gregory Listvoyb
(74) *Attorney, Agent, or Firm* — Cantor Colburn LLP

(57) ABSTRACT

A branched polyimide of the formula (I) wherein G is a group having a valence of t, present in an amount of 0.01 to 10 mol %, or 0.05 to 5 mol %, or 0.1 to 4 mol %, or 0.1 to 3 mol %, each of Q, M, D, V, and R are as defined herein, q is 0 or 1, m is 0 or 1, d is 0 or 1, p is 1 or 2, t is 2 to 6, preferably 2 to 4, and each n is independently the same or different, and is 1 to 1,000, provided that the total of all values of n is greater than 4, wherein the branched polyimide has a zero-shear viscosity in a range from 500 to 15,000 Pa·s, a rheology ratio of 1.1 to 5, and a strain hardening ratio of 1 to 6.

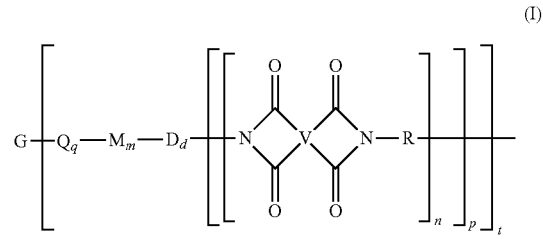

20 Claims, 3 Drawing Sheets

(56) References Cited

OTHER PUBLICATIONS

International Preliminary Report on Patentability; International Application No. PCT/US2017/068998; International Filing Date—Dec. 29, 2017; dated Apr. 11, 2019; 30 pages.
International Search Report; International Application No. PCT/US2017/068974; International Filing Date—Dec. 29, 2017; dated Apr. 10, 2018, 6 pages.
Qiu et al., "Synthesis and Characterization of Polyimides from Divalent Metal Salts of p-Aminobenzoic Acid," Journal of Applied Polymer Science, vol. 59, pp. 1437-1442; (1996).
Shiina et al., "Preparation and Properties of Polyimide-Silica Hybrid Films With Conjugation of the Polyimide and Silica by a Sol-Gel Process Using 3-(triethoxysilyl)Propyl Succinic Anhydride," Reactive and Functional Polymers 71 (2011); pp. 85-94.
Written Opinion; International Application No. PCT/US2017/068974; International Filing Date—Dec. 29, 2017; dated Apr. 10, 2018. 11 pages.
Zeng et al., "Synthesis and Characterization of Polyimides from Metal-Containing (Ba, Sr, Pb, Zn) Diamines," Polymer, vol. 36, No. 19, pp. 3761-3765, (1995).
Zhang et al., "Synthesis and Properties of Branched Sulfonated Polymides for Membranes in Vanadium Redox Flow Battery Application" Electrochimica Acta, 210 (2016); 13 pages.

\* cited by examiner

COMPOSITIONS AND ARTICLES MADE FROM BRANCHED POLYETHERIMIDES

CROSS REFERENCE TO RELATED APPLICATIONS

This application is a National Stage application of PCT/US2017/068998, filed Dec. 29, 2017, which claims the benefit of U.S. Provisional Patent Application No. 62/441,226, filed Dec. 31, 2016, the entire contents of which are incorporated by reference herein.

BACKGROUND

Polyimides (PIs), and in particular polyetherimides (PEIs), are amorphous, transparent, high performance polymers having a high glass transition temperature. Polyetherimides further have high strength, heat resistance, and modulus, and broad chemical resistance, and thus are widely used in applications as diverse as automotive, telecommunication, aerospace, electrical/electronics, transportation, and healthcare. Moreover, PEIs can be recycled, whereas some PIs are thermosets that cannot be recycled.

An ongoing challenge associated with polyimides and polyetherimides is synthesizing desirable polyimides and polyetherimides having long-chain branches (LCBs). The inclusion of long-chain branches can influence the melt strength of the polymers, and can reduce the melt viscosity of higher molecular weight polymers for a given processing temperature. Furthermore, long-chain branches can improve shear-thinning and extensional flow processing over linear analogues. For instance, the introduction of long-chain branches into polyesters (e.g., poly(ethylene terephthalate)) can improve melt strength and reduce the rate of crystallinity.

Accordingly, there remains a continuing need in the art for polyimides and polyetherimides that have long-chain branches.

SUMMARY

A branched polyimide has the formula

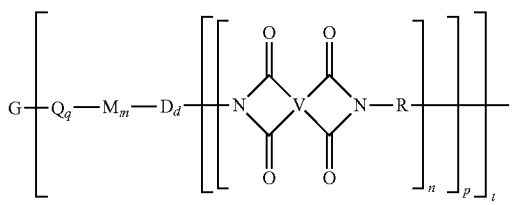

wherein G is a group having a valence of t, present in an amount of 0.01 to 10 mol %, or 0.05 to 5 mol %, or 0.1 to 4 mol %, or 0.1 to 3 mol %, each Q is independently the same or different, and is a divalent $C_{1-60}$ hydrocarbon group, each M is independently the same or different, and is —O—, —C(O)—, —OC(O)—, —OC(O)O—, —NHC(O), —(O)CNH—, —S—, —S(O)—, or —S(O)$_2$—, D is a phenylene, each V is independently the same or different, and is a tetravalent $C_{4-40}$ hydrocarbon group, each R is independently the same or different, and is a $C_{1-20}$ divalent hydrocarbon group, q is 0 or 1, m is 0 or 1, d is 0 or 1, p is 1 or 2, t is 2 to 6, preferably 2 to 4, and each n is independently the same or different, and is 1 to 1,000, preferably 2 to 500, or 3 to 100, provided that the total of all values of n is greater than 4, or greater than 10, or greater than 20, or greater than 50, or greater than 100, or greater than 250, and wherein the branched polyimide has a zero-shear viscosity in a range from 500 to 15,000 Pascal·seconds, preferably 750 to 10,000 Pascal·seconds, more preferably 800 to 8,000 Pascal·seconds, measured at 360° C., a rheology ratio of 1.1 to 5, preferably 1.3 to 4, more preferably 1.5 to 4, wherein the rheology ratio is the ratio of viscosity at a shear rate of 10/s to viscosity at a shear rate of 100/s, measured at 360° C., and a strain hardening ratio of 1 to 6, preferably 1.1 to 5, more preferably 1.5 to 4, wherein the strain hardening ratio is the ratio of extensional viscosity at a Hencky strain of 3 to extensional viscosity at a Hencky strain of 0.5, measured at 300° C. and a strain rate of 2/s.

A method for the manufacture of the branched polyimide includes reacting a polyamine of the formula

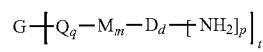

and a diamine of the formula H$_2$N—R—NH$_2$ with a dianhydride of the formula

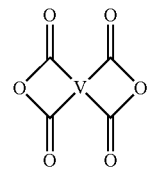

in a solvent and under conditions effective to provide the branched polyimide, wherein G, Q, M, D, R, V, q, m, d, p, and t are as defined herein.

Another method for the manufacture of the branched polyimide, wherein the branched polyimide is a branched polyetherimide, includes reacting a polyamine of the formula

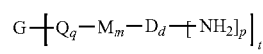

and a diamine of the formula H$_2$N—R—NH$_2$ with an anhydride of the formula

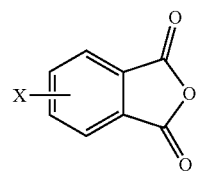

and a dianhydride of the formula

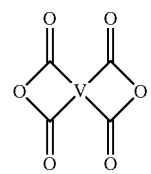

in a solvent and under conditions effective to provide the branched polyetherimide, wherein G, Q, M, D, R, V, q, m, d, p, and t are as defined herein.

A polymer composition includes the branched polyimide; and a second polymer that is not the same as the branched polyimide.

An article includes the branched polyimide or the polymer composition.

The above described and other features are exemplified by the following figures and detailed description.

BRIEF DESCRIPTION OF THE DRAWINGS

The following figures are exemplary embodiments wherein the like elements are numbered alike.

DETAILED DESCRIPTION

Figure 1:
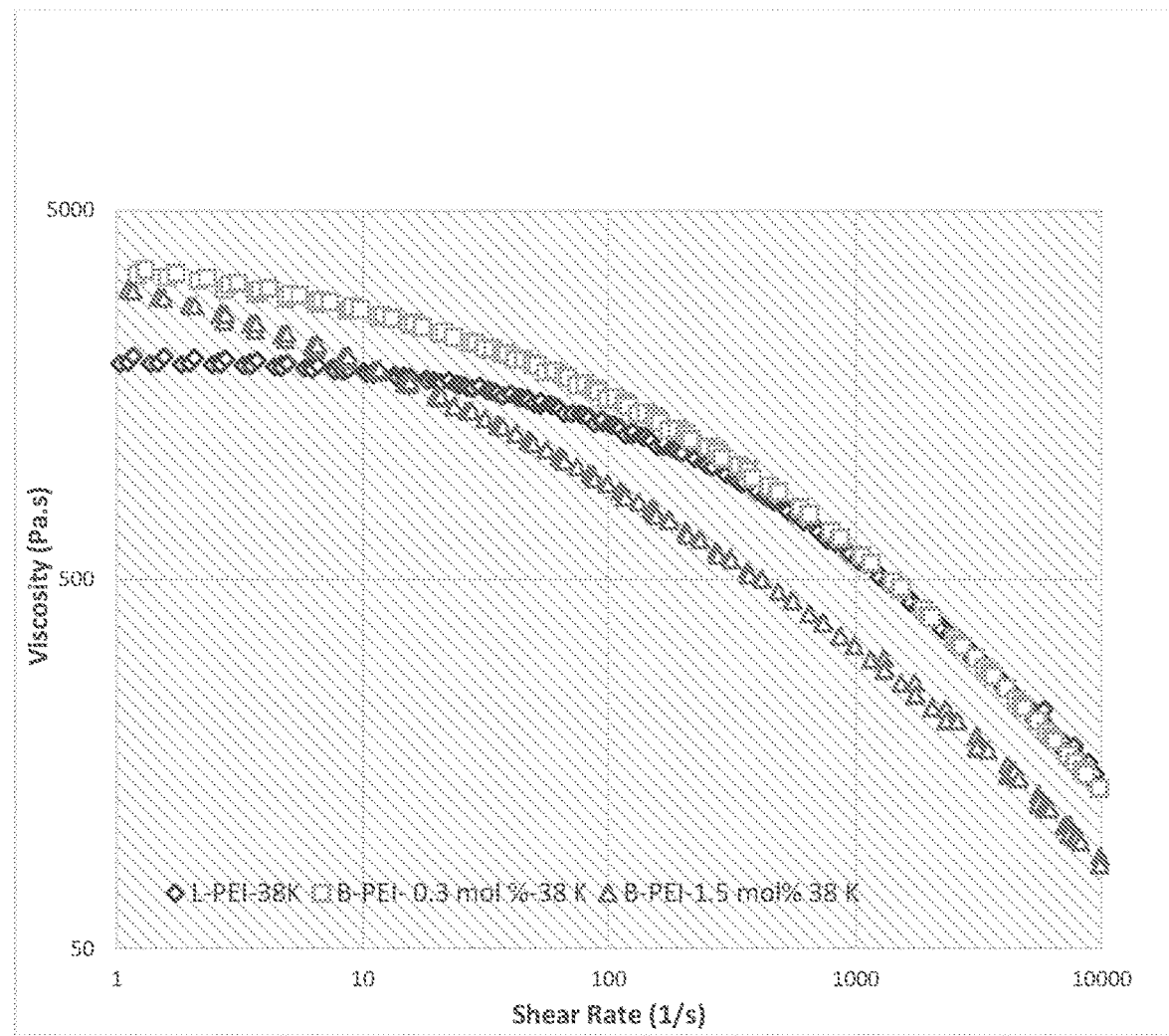
FIG. 1 is a graph of viscosity (Pascal seconds, Pa·s) versus shear rate (1/seconds, 1/s) for PEI oligomers according to embodiments.

The inventors hereof have discovered that the synthesis of poly-functional aryl amines (polyamines), and subsequent polymerization with a dianhydride and a diamine, provides long chain branched poly(imides) (LCB-PIs) and polyetherimides (LCB-PEIs). Careful consideration of the reaction conditions and molar ratios permits the manufacture of LCB-PEIs having particular melt and rheological properties. Incorporation of the polyamines into PEI resulted in LCB-PEIs having increased rheology ratios and increased viscosity over time at elevated temperatures, and these properties could be varied based on the molecular weights of the LCB-PEIs.

Such properties are especially useful in the manufacture of articles such as thermoformed articles, spun fibers, foams, thin-wall components, or polymer additives, where high-flow properties, especially low melt viscosity under the high shear conditions are important in injection molding. The LCB-PI and LCB-PEI can satisfy this criterion and fare better than the linear chained counterpart of the same molecular weight. An LCB-PI and LCB-PEI, based on the amount of branching and molecular weight, can shear thin faster or slower, giving lower or higher viscosities and subsequently higher or lower flow rates according to processing demands, while at the same time having physical and mechanical properties that are comparable to their linear chained counterparts.

The branched polyimide is of formula (1) or (1').

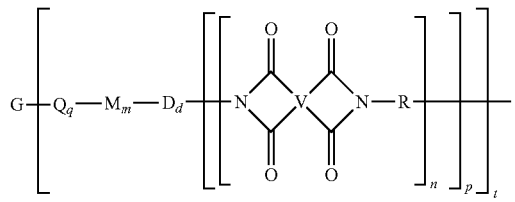
(1)

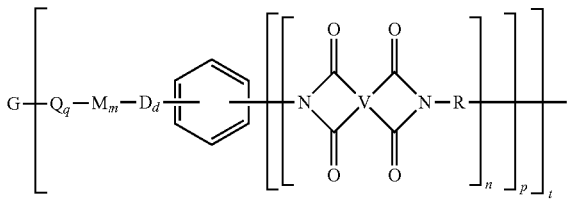
(1')

In formula (1) and (1'), G is a group having a valence of t, present in an amount of 0.01 to 10 mol %, or 0.05 to 5 mol %, or 0.1 to 4 mol %, or 0.1 to 3 mol %, q is 0 or 1, m is 0 or 1, d is 0 or 1, p is 1 or 2, t is 2 to 6, preferably 2 to 4. In an embodiment In formula (1) and (1'), each Q is independently the same or different, and is a divalent $C_{1-60}$ hydrocarbon group. In a preferred embodiment, Q is a $C_{6-20}$ arylene, a $C_{1-20}$ alkylene, or a $C_{3-8}$ cycloalkylene. In a more preferred embodiment, Q is a $C_{6-20}$ arylene.

In formula (1) and (1'), each M is independently the same or different, and is —O—, —C(O)—, —OC(O)—, —OC(O)O—, —NHC(O), —(O)CNH—, —S—, —S(O)—, or —S(O)$_2$—. In another embodiment, M is —O—, —C(O)—, —OC(O)—, —P(R$^a$)—, or —P(O)R$^a$—. In an embodiment, M is —O—, —C(O)—, —OC(O)—, —P(R$^a$)—, or —P(O)R$^a$— wherein R$^a$ is a $C_{1-8}$ alkyl or $C_{6-12}$ aryl.

In formula (1) and (1'), each D is phenylene. In an embodiment, each D is the same or different, and is m-phenylene or p-phenylene. In another embodiment, each D is the same or different, and is m-phenylene, p-phenylene, bis(4,4'-phenylene)sulfone, bis(3,4'-phenylene)sulfone, or bis(3,3'-phenylene)sulfone.

Further in formula (1) and (1'), each V is independently the same or different, and is a tetravalent $C_{4-40}$ hydrocarbon group. In an embodiment, V is a $C_{6-40}$ aromatic hydrocarbon group. Exemplary aromatic hydrocarbon groups include any of formula (2)

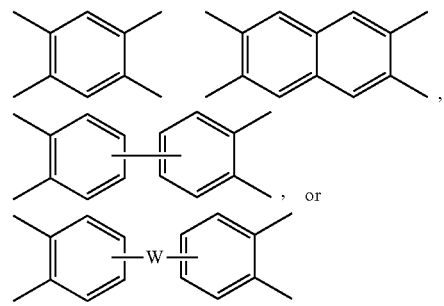
(2)

wherein W is —O—, S, C(O)—, —SO$_2$—, —SO—, —P(R$^a$)(=O)— wherein R$^a$ is a $C_{1-8}$ alkyl or $C_{6-12}$ aryl, —C$_y$H$_{2y}$— wherein y is an integer from 1 to 5 or a halogenated derivative thereof (which includes perfluoroalkylene groups), or a group of the formula —O—Z—O— as described in formula (1a) and (1a') below.

Also in formula (1) and (1'), each R is independently the same or different, and is a $C_{1-20}$ divalent hydrocarbon group. Specifically, each R can be the same or different, and is a divalent organic group, such as a $C_{6-20}$ aromatic hydrocarbon group or a halogenated derivative thereof, a straight or branched chain $C_{2-20}$ alkylene group or a halogenated derivative thereof, a $C_{3-8}$ cycloalkylene group or halogenated derivative thereof, in particular a divalent group of any of formulas (3)

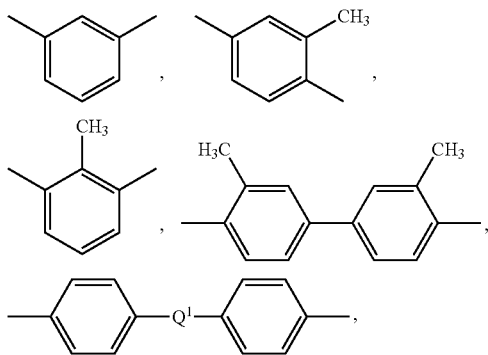
(3)

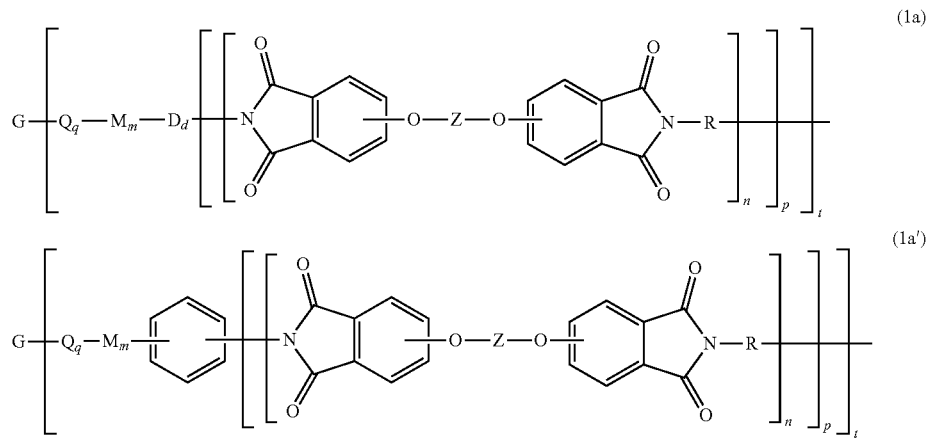

wherein $Q^1$ is —O—, —S—, —C(O)—, —SO$_2$—, —SO—, —P(R$^a$)(=O)— wherein R$^a$ is a $C_{1-8}$ alkyl or $C_{6-12}$ aryl, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4. In an embodiment R is m-phenylene, p-phenylene, or a diarylene sulfone.

Still further in formula (1) and (1'), each n is independently the same or different, and is 1 to 1,000, preferably 2 to 500, or 3 to 100, provided that the total of all values of n is greater than 4, preferably greater than 10, more preferably greater than 20, or greater than 50, or greater than 100, or greater than 250, or 4 to 50, or 10 to 50, or 20 to 50, or 4 to 100, or 10 to 100, or 20 to 100.

In another specific embodiment, the polyimide of formula (1) or (1') can be a branched polyetherimide of formula (1a), preferably (1 a')

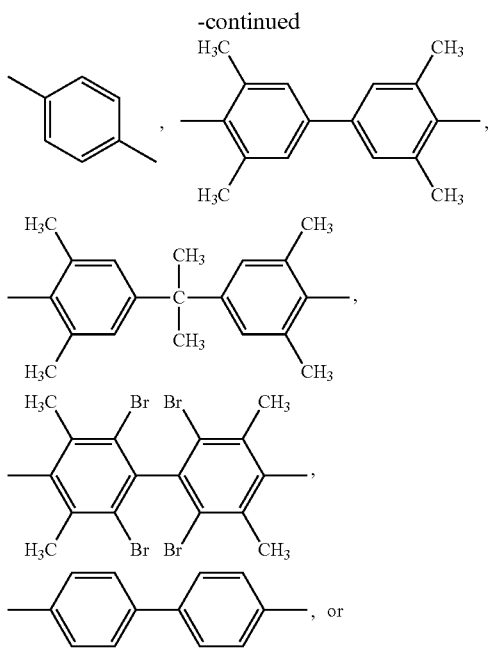
-continued

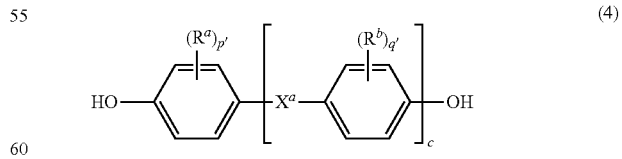
, or wherein G, Q, M, D, R, q, m, d, n, p, and t are as defined in formula (1) and (1'), and wherein the divalent bonds of the —O—Z—O— group are in the 3,3', 3,4', 4,3', or the 4,4' positions. The group Z in —O—Z—O— of formula (1a) and (1a') is a divalent organic group, and can be an aromatic $C_{6-24}$ monocyclic or polycyclic moiety optionally substituted with 1 to 6 $C_{1-8}$ alkyl groups, 1 to 8 halogen atoms, or a combination thereof, provided that the valence of Z is not exceeded. Exemplary groups Z include groups derived from a dihydroxy compound of formula (4)

$$\text{HO}-\underset{(R^a)_{p'}}{\underset{|}{\bigcirc}}-\left[X^a-\underset{(R^b)_{q'}}{\underset{|}{\bigcirc}}\right]_c-\text{OH}$$
(4)

wherein $R^a$ and $R^b$ can be the same or different and are a halogen atom or a monovalent $C_{1-6}$ alkyl group, for example; p' and q' are each independently integers of 0 to 4; c is 0 to 4; and $X^a$ is a bridging group connecting the hydroxy-substituted aromatic groups, where the bridging group and the hydroxy substituent of each $C_6$ arylene group are disposed ortho, meta, or para (specifically para) to each other on the $C_6$ arylene group. The bridging group $X^a$ can be a single bond, —O—, —S—, S(O)—, —S(O)$_2$—, —C(O)—, or a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. A specific example of a group Z is a divalent group of formula (4a)

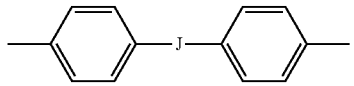
(4a)

wherein J is —O—, —S—, —C(O)—, —SO$_2$—, —SO—, or —C$_y$H$_{2y}$— wherein y is an integer from 1 to 5 or a halogenated derivative thereof (including a perfluoroalkylene group). In a specific embodiment Z is a derived from bisphenol A, such that J in formula (4a) is 2,2-isopropylidene.

In an embodiment in formulas (1), (1'), (1a), and (1a'), R is m-phenylene or p-phenylene, bis(4,4'-phenylene)sulfone, bis(3,4'-phenylene)sulfone, or bis(3,3'-phenylene)sulfone. In this embodiment, Z can be a divalent group of formula (4a). In an alternative embodiment, R is m-phenylene or p-phenylene and Z is a divalent group of formula (4a) and J is 2,2-isopropylidene.

In some embodiments, the branched polyimide can be a copolymer, for example a polyetherimide sulfone copolymer comprising structural units of formulas (1), (1'), (1a), or (1a') wherein at least 50 mol % of the R groups are of formula (3) wherein $Q^1$ is —SO$_2$— and the remaining R groups are independently p-phenylene or m-phenylene or a combination thereof; and Z is 2,2'-(4-phenylene)isopropylidene. Alternatively, the polyetherimide copolymer optionally comprises additional structural imide units, for example imide units wherein V is of formula (2a) wherein R and V are as described in formula (2a), for example V is

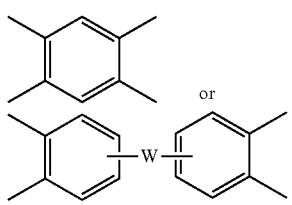
(2a)

wherein W is a single bond, —O—, —S—, —C(O)—, —SO$_2$—, —SO—, —P(R$^a$)(=O)— wherein R$^a$ is a $C_{1-8}$ alkyl or $C_{6-12}$ aryl, or —C$_y$H$_{2y}$— wherein y is an integer from 1 to 5 or a halogenated derivative thereof (which includes perfluoroalkylene groups). These additional structural imide units can comprise less than 20 mol % of the total number of units, or 0 to 10 mol % of the total number of units, or 0 to 5 mol % of the total number of units, or 0 to 2 mol % of the total number of units. In some embodiments, no additional imide units are present in the polyimides other than polyetherimide units.

The branched polyimide (which as indicated above include polyimides (1) and (1') and the branched polyetherimides (1a) and (1a')), can be prepared by methods known in the art, including a polycondensation or ether-forming polymerization. In any process, the appropriate amount of a polyamine of formula (5), preferably of formula (5')

(5)

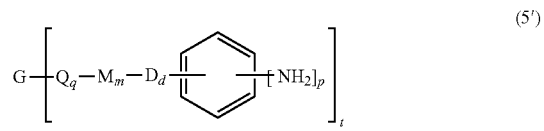
(5')

is introduced during manufacture of the branched polyimide as described in further detail below. In formula (5) and (5'), G, Q, M, D, q, m, d, p, and t are defined as described in formulas (1), (1'), (1a), and (1a').

Exemplary polyamines (5) and (5') can include any of formulas (5a)-(5t):

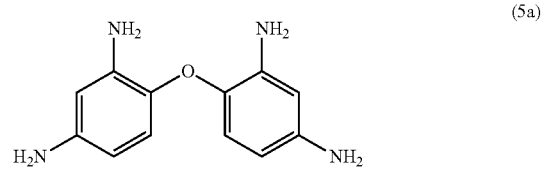
(5a)

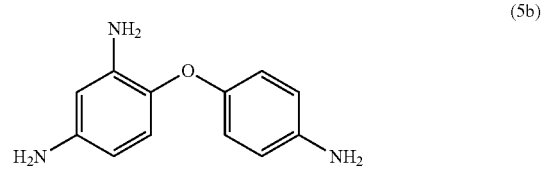
(5b)

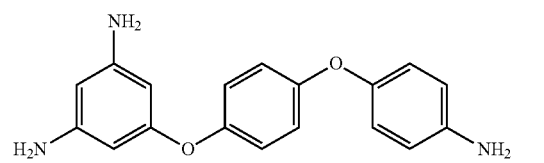
(5c)

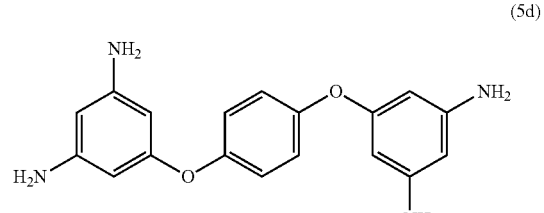
(5d)

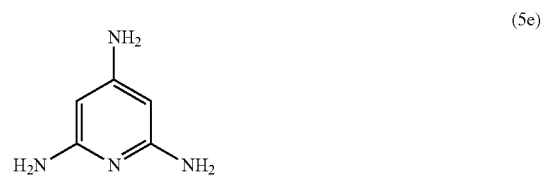
(5e)

(5f)
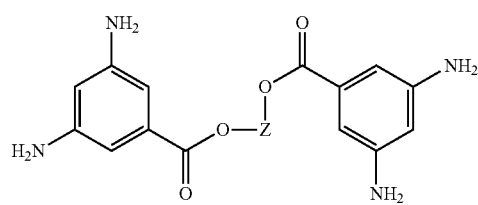
(5g)
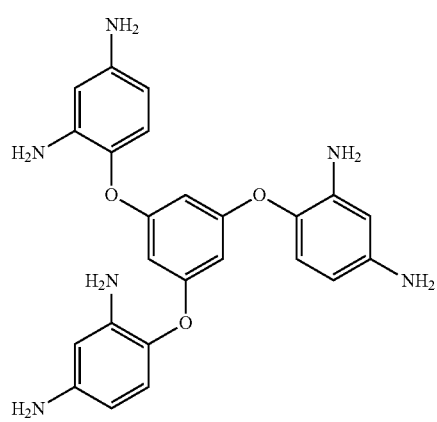
(5h)
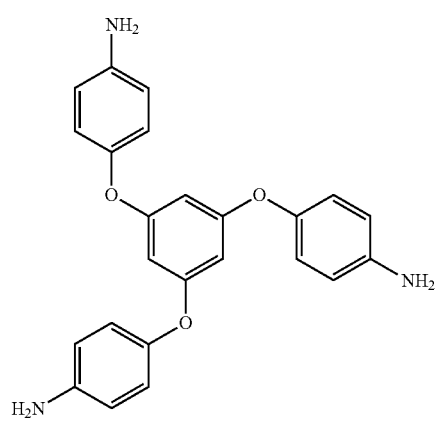
(5i)
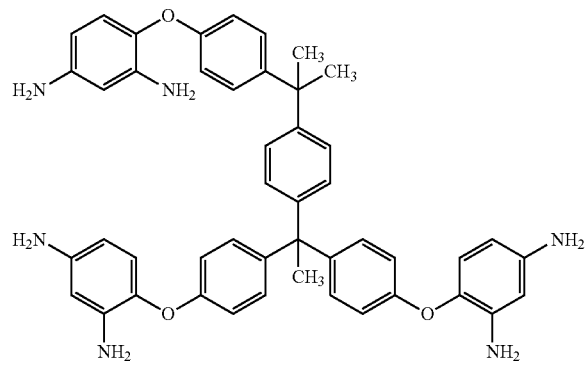
(5j)
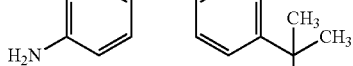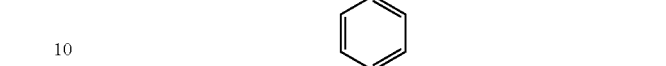
(5k)
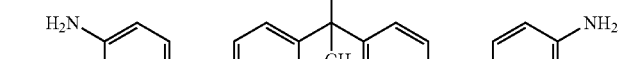
(5l)
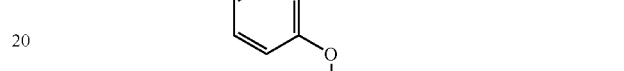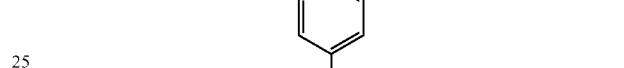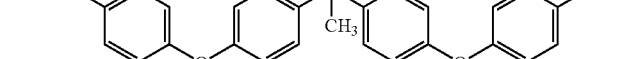
(5m)
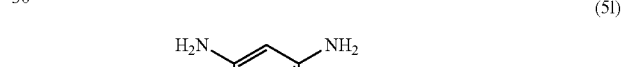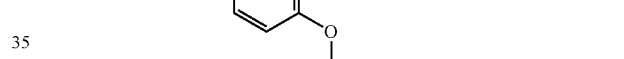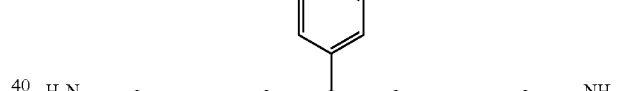
(5n)
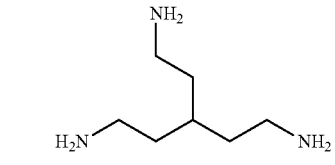

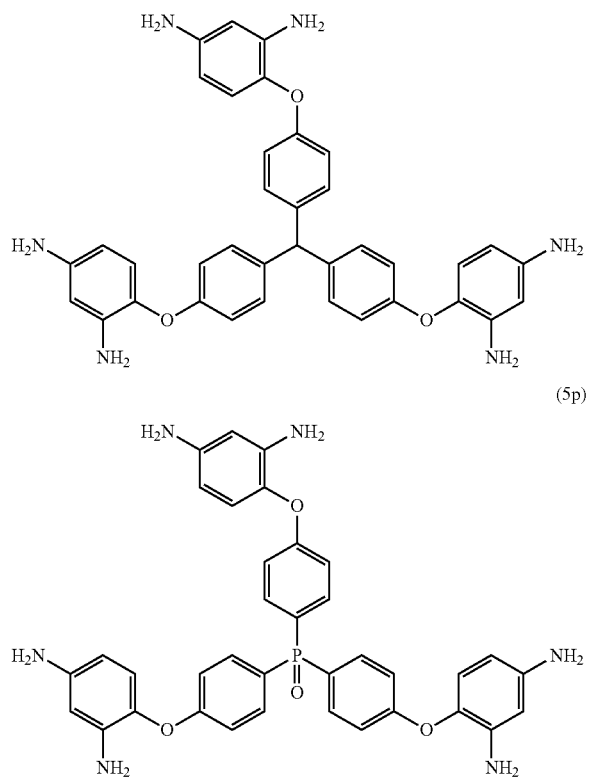

wherein, in formula (5f), Z is a divalent $C_{1-60}$ hydrocarbon group, or a $C_{6-40}$ aromatic hydrocarbon group (e.g., phenylene), a $C_{2-20}$ aliphatic group, or a $C_{4-8}$ cycloaliphatic group. In a particular embodiment, the polyamine is of the formulas (5b), (5k), (5r), (5s), or (5t), preferably 5(k).

Methods for the synthesis of the polyamines are known in the art. An exemplary method for the synthesis of the polyamine of formulas (5) and (5') uses a two-step sequence. The first step, is a nucleophilic aromatic substitution of a halogenated aromatic nitro compound (e.g., 1-chloro-4-nitrobenzene) with a polyphenol (e.g., 1,1,1-tris(4-hydroxyphenyl) ethane) that is converted to a polyphenoxide in-situ, providing a sufficiently nucleophilic oxygen to displace the activated halide. A polar aprotic solvent (e.g., dimethylacetamide) can promote the substitution reaction to afford a poly(nitrophenyl) compound (e.g., 1,1,1-tris((p-nitrophenoxy)phenyl) ethane). The second step is a reduction of the poly(nitrophenyl) compound to the polyamine of formula (5) (e.g., 1,1,1-tris[4-(4-aminophenoxy)phenyl]ethane) using, for example, a palladium catalyst with a reducing agent, an iron-based catalyst, vasicine, zinc, samarium, and hydrazine.

The branched polyimide can be prepared by polycondensation, which includes an imidization of a dianhydride of formula (6) or formula (6a)

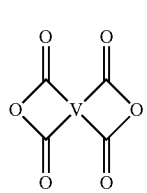

(6)

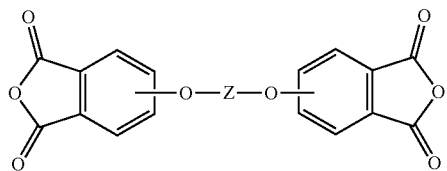

or a chemical equivalent thereof, with a combination of an organic diamine of formula (7)

and the polyamine of formula (5), preferably of formula (5'), wherein V, Z, R, G, Q, M, D, q, m, d, p, and t are defined as described in formulas (1), (1'), (1a), and (1a'). The polyamine (5), preferably (5') can be present in the reaction in an amount of 0.01 to 10 mol %, or 0.05 to 5 mol %, or 0.1 to 4 mol %, or 0.1 to 3 mol %, to achieve a desired zero-shear viscosity, rheology ratio, and strain hardening ratio.

Exemplary dianhydrides (6) or (6a) include 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride; and, 4-(2,3-dicarboxyphenoxy)-4'-(3,4-dicarboxyphenoxy)diphenyl sulfone dianhydride, as well as various combinations thereof.

Specific examples of organic diamines (7) include hexamethylenediamine, polymethylated 1,6-n-hexanediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl) benzene, bis(p-methyl-o-aminopentyl) benzene, 1, 3-diamino-4-isopropylbenzene, bis(4-aminophenyl) sulfide, bis-(4-aminophenyl) sulfone (also known as 4,4'-diaminodiphenyl sulfone (DDS)), and bis(4-aminophenyl) ether. Any regioisomer of the foregoing compounds can be used. Combinations of these compounds can also be used. In some embodiments the organic diamine is m-phenylenediamine, p-phenylenediamine, 4,4'-diaminodiphenyl sulfone, or a combination thereof.

An endcapping agent can be present during imidization, in particular a monofunctional compound that can react with an amine or anhydride. Exemplary compounds include monofunctional aromatic anhydrides such as phthalic anhydride, an aliphatic monoanhydride such as maleic anhydride, or monofunctional aldehydes, ketones, esters isocyanates, aromatic monoamines such as aniline, or $C_1$-$C_{18}$ linear or cyclic aliphatic monoamines. A monofunctional bisphthalimide can also be added before or during imidization. The amount of endcapping agent that can be added depends on the desired amount of chain terminating agent, and can be, for example, more than 0 to 10 mole percent (mol %), or 0.1 to 10 mol %, or 0.1 to 6 mol %, based on the moles of endcapping agent and amine or anhydride reactant.

A catalyst can be present during imidization. Exemplary catalysts include sodium aryl phosphinates, guanidinium salts, pyridinium salts, imidazolium salts, tetra($C_{7-24}$ arylalkylene) ammonium salts, dialkyl heterocycloaliphatic ammonium salts, bis-alkyl quaternary ammonium salts, ($C_{7-24}$ arylalkylene)($C_{1-16}$ alkyl) phosphonium salts, ($C_{6-24}$ aryl)($C_{1-16}$ alkyl) phosphonium salts, phosphazenium salts, and combinations thereof. The anionic component of the salt is not particularly limited, and can be, for example, chloride, bromide, iodide, sulfate, phosphate, acetate, maculate, tosylate, and the like. A combination of different anions can be used. A catalytically active amount of the catalyst can be determined by one of skill in the art without undue experimentation, and can be, for example, more than 0 to 5 mol % percent, or 0.01 to 2 mol %, or 0.1 to 1.5 mol %, or 0.2 to 1.0 mol % based on the moles of polyamine (5) or (5') and organic diamine (7).

Conditions effective to provide the branched polyimides are generally known. Polymerization is generally carried out in a solvent, for example relatively non-polar solvents with a boiling point above 100° C., or above 150° C., for example o-dichlorobenzene, dichlorotoluene, 1,2,4-trichlorobenzene, diphenyl sulfone, or a monoalkoxybenzene such as anisole, veratrole, diphenylether, or phenetole. Ortho-dichlorobenzene and anisole can be particularly mentioned. The polymerization is generally at least 110° C., or 150 to 275° C., or 175 to 225° C. for solution polymerization. At temperatures below 110° C., reaction rates may be too slow for economical operation. Atmospheric or super-atmospheric pressures can be used, for example up to 5 atmospheres, to facilitate the use of high temperatures without causing solvent to be lost by evaporation. Effective times depend on the particular reactants and reaction conditions, and can be 0.5 hours to 3 days, for example, generally for 0.5 to 72 hours, specifically 1 to 30 or 2 to 20 hours. Advantageously, the reaction is complete 20 hours or less, preferably 10 hours or less, more preferably 3 hours or less.

It has been found that improved compositions can be obtained by pre-dissolving the polyamine (5), preferably (5'), and the organic diamine (7) before adding the dianhydride (6) or (6a), or before adding the diamine/polyamine to the dianhydride. The catalyst can be added any time during the reaction between the polyamine (5), preferably (5'), and organic diamine (7), and the dianhydride (6) or (6a) continuously or in portions during the course of the reaction. In some embodiments, the catalyst is added after pre-dissolution the polyamine (5), preferably (5'), and organic diamine (7), with the dianhydride (6) or (6a).

A molar ratio of dianhydride (6) or (6a) to a combination of polyamine (5), preferably (5'), and organic diamine (7) of 0.9:1 to 1.1:1, or 1:1 can be used. While other ratios can be used, a slight excess of dianhydride or diamine may be desirable. A proper stoichiometric balance between the dianhydride and combination of polyamine (5), preferably (5'), and organic diamine (7) is maintained to allow for the production of the desired molecular weight of the polymer, or prevent the formation of polymer with significant amounts of amine end groups. Accordingly, in an embodiment, imidization proceeds via forming an initial reaction mixture having a targeted initial molar ratio of dianhydride (6) or (6a) to a combination of polyamine (5), preferably (5'), and organic diamine (7); heating the reaction mixture to a temperature of at least 100° C. to initiate polymerization; analyzing the molar ratio of the heated reaction mixture to determine the actual initial molar ratio of dianhydride (6) or (6a) to polyamine (5), preferably (5'), and organic diamine (7), using, e.g., an infrared spectroscopy technique; and, if necessary, adding dianhydride (6) or (6a), or polyamine (5), preferably (5'), or organic diamine (7) to the analyzed reaction mixture to adjust the molar ratio of dianhydride (6) or (6a) to polyamine (5), preferably (5'), and organic diamine (7) to 0.9:1 to 1.1:1.

If an amine-containing endcapping agent is used, the amount can be more than 0 to 10 mol % based on the total amount of dianhydride (6) or (6a). If an anhydride-containing endcapping agent is used, the amount can be in the range of more than 0 to 20 mol %, or 1 to 10 mol % based on the amount of the polyamine (5), preferably (5'), and organic diamine (7) combined. In general, due to the presence of the polyamines, an anhydride-containing endcapping agent is used to decrease the number of amine end groups in the branched polyimides and polyetherimides. The endcapping agent can be added at any time. In some embodiments, the endcapping agents are mixed with or dissolved into reactants having the similar functionality. For example, anhydride-containing endcapping agent can be combined with dianhydride (6) or (6a). Where an anhydride-containing endcapping agent is used, in order to achieve maximum molecular weight, the quantity of amine functionality ([2×diamine moles]+[t×polyamine, moles wherein t is the number of reactive amino groups])=moles of anhydride functionality ([2×dianhydride moles+moles of anhydride in the endcapping agent]). As described above, the stoichiometry condition of the polymerization reaction mixture can be analyzed, and the stoichiometry corrected if needed to provide a stoichiometry within ±0.2 mol % of a stoichiometry of 1:1.

In other embodiments, the branched polyimide is a branched polyetherimide, and can be synthesized by an ether-forming polymerization, which proceeds via an imidization, i.e., reaction of the polyamine of formula (5), preferably (5'), and the diamine of formula (7) with an anhydride of formula (8)

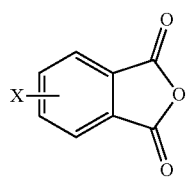

(8)

wherein X is a nitro group or halogen, to provide intermediate bis(phthalimide)s of the formulas (9a) and (9b)

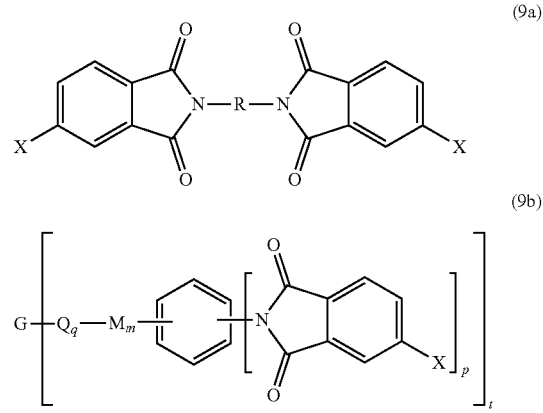

wherein G, Q, M, q, m, p, and t are as described in formula (1) and (1a) and X is as described in formula (8). The polyamine (5), preferably (5'), can be present in the reaction in an amount of 0.01 to 10 mol %, or 0.05 to 5 mol %, or 0.1 to 4 mol %, or 0.1 to 3 mol % to achieve increased branching. An optional catalyst or optional monofunctional chain terminating agent as described above can be present during imidization.

The bis(phthalimide)s (9a) and (9b) are reacted with an alkali metal salt of a dihydroxy aromatic compound of formula (10)

AMO—Z—OAM (10)

wherein AM is an alkali metal and Z is as defined above, to provide the branched polyetherimide. Polymerization conditions effective to provide the branched polyimide are generally known, and can be conducted in a solvent as described above. This polymerization can also be conducted in the melt, for example at 250 to 350° C., where a solvent is generally not present.

The branched polyimide has a zero-shear viscosity in a range from 500 to 15,000 Pascal·seconds (Pa·s), preferably 750 to 10,000 Pa·s, more preferably 800 to 8,000 Pa·s, measured at 360° C. In some embodiment, the zero-shear viscosity is 500 to 10,000 Pa·s, or 500 to 8,000 Pa·s, or 750 to 8,000 Pa·s, or 800 to 5,000 Pa·s, or 800 to 2,500 Pa·s, measured at 360° C.

The branched polyimide has a strain hardening ratio of 1 to 6, preferably 1.1 to 5, more preferably 1.5 to 4, wherein the strain hardening ratio is the ratio of extensional viscosity at a Hencky strain of 3 to extensional viscosity at a Hencky strain of 0.5, as measured at 360° C. and a strain rate of 2/s. In some embodiments, the branched polyimide has a strain hardening ratio of 2 to 6, or 2.5 to 6, or 3 to 6, or 1 to 5, or 2 to 5, or 1.1 to 6, or 1.1 to 4.5, or 1.1 to 4, or 1.2 to 6, or 1.2 to 5, or 1.2 to 4, or 1.2 to 3, or 1.3 to 6, or 1.3 to 5, or 1.3 to 4, or 1.3 to 3, or 1.4 to 6, or 1.4 to 5, or 1.4 to 4, or 1.4 to 3, or 1.5 to 6, or 1.5 to 5, or 1.5 to 3, or 1.6 to 6, or 1.6 to 5, or 1.6 to 4, or 1.6 to 3, or 1.7 to 6, or 1.7 to 5, or 1.7 to 4, or 1.8 to 6, or 1.8 to 5, or 1.8 to 4, wherein the strain hardening ratio is the ratio of extensional viscosity at a Hencky strain of 3 to extensional viscosity at a Hencky strain of 0.5, as measured at 360° C. and a strain rate of 2/s.

The branched polyimide has a rheology ratio of 1.1 to 5, preferably 1.3 to 4, more preferably 1.5 to 4, wherein the rheology ratio is the ratio of viscosity at a shear rate of 10/s to viscosity at a shear rate of 100/s, as measured at 300° C. In some embodiments, the rheology ratio is 1.2 to 5, or 1.2 to 4, or 1.3 to 5, or 1.3 to 4, or 1.3 to 3, or 1.3 to 2.5, or 1.3 to 2.4, or 1.3 to 2.3, or 1.3 to 2.2, or 1.3 to 2.1, or 1.4 to 5, or 1.4 to 4, or 1.4 to 3, or 1.4 to 2.5, or 1.4 to 2.4, or 1.4 to 2.3, or 1.4 to 2.2, or 1.4 to 2.1, wherein the rheology ratio is the ratio of viscosity at a shear rate of 10/s to viscosity at a shear rate of 100/s, as measured at 300° C.

The branched polyimide can have a weight average molecular weight ($M_w$) of 1,000 to 150,000 g/mol, or 10,000 to 80,000 g/mol, or 20,000 to 80,000 g/mol, as measured by gel permeation chromatography (GPC), using polystyrene standards, or a triple point detector. In preferred embodiments, the branched polyimide has an $M_w$ of 20,000 to 75,000 g/mol, or 30,000 to 75,000 g/mol, more preferably 25,000 to 70,000 g/mol, 25,000 to 70,000 g/mol, even more preferably 30,000 to 68,000 g/mol, or 30,000 to 65,000 g/mol.

In a specific embodiment, the branched polyimide has a $M_w$ of 30,000 to 40,000 g/mol, preferably 31,000 to 39,000 g/mol, more preferably 33,000 to 39,000 g/mol, wherein G is present in an amount of 0.3 to 0.5 mole percent, the rheology ratio is 1.1 to 1.5, and the strain hardening ratio is 1.1 to 1.5; or G is present in an amount of 0.5 to 2 mole percent, the rheology ratio is 1.3 to 1.7, and the strain hardening ratio is 1.5 to 2.5; G is present in an amount of 2 to 3 mole percent, the rheology ratio is 1.6 to 2, and the strain hardening ratio is 2.5 to 3.

In another specific embodiment, the branched polyimide has a $M_w$ of 40,100 to 52,000 g/mol, preferably 41,000 to 49,000 g/mol, more preferably 42,000 to 48,000 g/mol, wherein G is present in an amount of 0.3 to 0.5 mole percent, the rheology ratio is 1.5 to 2.5, and the strain hardening ratio is 3 to 4; or G is present in an amount of 0.5 to 2 mole percent, the rheology ratio is 2 to 2.5, and the strain hardening ratio is 4 to 5; or G is present in an amount of 2 to 3 mole percent, the rheology ratio is 2.5 to 3, and the strain hardening ratio is 4.5 to 5.

In particular embodiments, the branched polyimide has a $M_w$ of 52,100 to 68,000 g/mol, preferably 53,000 to 67,000 g/mol, more preferably 54,000 to 66,000 g/mol, wherein G is present in an amount of 0.3 to 0.5 mole percent, the rheology ratio is 2 to 4, and the strain hardening ratio is 3 to 6; or G is present in an amount of 0.5 to 2 mole percent, the rheology ratio is 2.5 to 4, and the strain hardening ratio is 4 to 6; or G is present in an amount of 2 to 3 mole percent, the rheology ratio is 3 to 4, and the strain hardening ratio is 5 to 6.

The branched polyimide can have a melt flow rate (MFR) of 2 to 25 grams per 10 minutes (g/10 min), preferably 5 to 20 g/10 min, more preferably 10 to 20 g/10 min, measured at 337° C. according to ASTM D1238-10. In some embodiments, the MFR is 2 to 20 g/10 min, or 3 to 20 g/10 min, or 4 to 20 g/10 min, or 6 to 20 g/10 min, or 8 to 20 g/10 min, or 10 to 20 g/10 min, or 12 to 20 g/10 min, or 2 to 15 g/10 min, or 2 to 14 g/10 min, or 2 to 12 g/10 min, or 2 to 10 g/10 min, measured at 337° C. according to ASTM D1238-10.

The branched polyimide can have a viscosity increase of 25 to 1,000%, preferably 75 to 1,000%, more preferably 100 to 1,000% after 1,800 seconds, measured at 400° C. and a shear rate of 640/s. In an embodiment, the viscosity increase is 25 to 750%, or 25 to 700%, or 25 to 650%, or 25 to 600%, or 75 to 750%, or 75 to 700%, or 75 to 650%, or 75 to 600%, or 100 to 750%, or 100 to 700%, or 100 to 650%, or 100 to 600%, or 150 to 750%, or 150 to 700%, or 150 to 650%, or 150 to 600%, or 25 to 300%, or 25 to 250%, or 25 to 200%, or 25 to 180%, or 25 to 160%, or 25 to 140%, or 25 to 120%, or 25 to 100% after 1,800 seconds, measured at 400° C. and a shear rate of 640/s.

The branched polyimide can have an apparent viscosity of 350 to 1,200 Pa·s, preferably 400 to 1,100 Pa·s, more preferably 500 to 1,000 Pa·s at a shear rate of 640/s. In some embodiments, the apparent viscosity is 350 to 1,100 Pa·s, or 350 to 1,000 Pa·s, or 400 to 1,000 Pa·s, or 400 to 900 Pa·s, or 400 to 800 Pa·s, or 400 to 600 Pa·s, 500 to 1,200 Pa·s, or 500 to 1,100 Pa·s, or 500 to 900 Pa·s, or 500 to 800 Pa·s, at a shear rate of 640/s.

The branched polyimide can have a tensile elongation at break of greater than 8%, preferably greater than 9%, more preferably greater than 10%, measured at 23° C. according to ASTM D638. In certain embodiments, the tensile elongation at break is 8 to 75%, or 8 to 70%, or 9 to 70%, or 9 to 65%, or 10 to 70%, or 10 to 65%, or 11 to 70%, or 11 to 65%, or 12 to 70%, or 12 to 65%, or 13 to 70%, or 13 to 65%, or 14 to 70%, or 14 to 65%, or 15 to 70%, or 15 to 65%, or 16 to 70%, or 16 to 65%, measured at 23° C. according to ASTM D638.

The branched polyimide can have a notched Izod impact strength of at least 25 Joules per meter (J/m), preferably at least 30 J/m, more preferably at least 32 J/m, measured at 23° C. according to ASTM D256-10. In some embodiments, the notched Izod impact strength is at least 26 J/m, at least 27 J/m, at least 28 J/m, at least 29 J/m, at least 31 J/m, at least 33 J/m, at least 34 J/m, or at least 35 J/m, measured at 23° C. according to ASTM D256-10.

The branched polyimide can have an unnotched Izod impact strength of at least 1,000 J/m, preferably at least 1,100 J/m, more preferably at least 1,200 J/m, measured at 23° C. according to ASTM D256-10. In some embodiments, the branched polyimide has an unnotched Izod impact strength of at least 1,150 J/m, or at least 1250 J/m, or at least 1,300 J/m, or at least 1,350 J/m, or at least 1,400 J/m, or at least 1,450 J/m, or at least 1,500 J/m, or at least 1,550 J/m, or at least 1,600 J/m, or at least 1,650 J/m, or at least 1,700 J/m, measured at 23° C. according to ASTM D256-10.

The branched polyimide can have a reverse notched Izod impact strength of at least 600 J/m, preferably at least 700 J/m, more preferably at least 800 J/m, measured at 23° C. according to ASTM D256-10. In some embodiments, the reverse notched Izod impact strength is at least 750 J/m, or at least 850 J/m, or at least 900 J/m, or at least 950 J/m, or at least 1,000 J/m, or at least 1,050 J/m, measured at 23° C. according to ASTM D256-10.

In still other embodiments the branched polyimide can have a $T_g$ greater than 100° C., preferably 100 to 395° C., more preferably 180 to 280° C., even more preferably 200 to 250° C., as determined by differential scanning calorimetry. The branched polyimide can have an average branch molecular weight of 12,000 to 50,000 grams per mole (g/mol). The branched polyimide can have a polydispersity (PDI) of 1.5 to 6, preferably 2 to 5, more preferably 2.5 to 5, as determined by size exclusion chromatography multi-angle light scattering (SEC-MALS). In some embodiments, the branched polyimide can have an intrinsic viscosity greater than 0.2 deciliters per gram (dL/g), or, more specifically, 0.35 to 0.7 dL/g, as measured in m-cresol at 25° C. The branched polyimide can have a Vicat softening temperature of at least 200° C., preferably at least 205° C., more preferably 200 to 210° C., according to ASTM D1525 (ISO 306).

The branched polyimide has a UL94 rating of V-1 or better, as measured following the procedure of Underwriter's Laboratory Bulletin 94 entitled "Tests for Flammability of Plastic Materials for Parts in Devices and Appliances" (ISBN 0-7629-0082-2), Fifth Edition, Dated Oct. 29, 1996, incorporating revisions through and including Dec. 12, 2003. In an embodiment, the branched polyimide has a UL94 rating of V-0 or V-1 at a thickness of 0.3, 0.5, 0.75, 0.9, 1, 1.5, 2, or 3 mm. In some embodiments, the branched polyimide has a UL94 rating of V-0 at a thickness of 0.3, 0.5, 0.75, 0.9, 1, 1.5, 2, or 3 mm. In a particular embodiment, the branched polyimide has a UL94 rating of V-0 at a thickness of 0.5 or 1.5 mm.

As described herein, the polyamines (5), preferably (5'), and organic diamines (7) are reacted in combination, wherein the polyamine is present in an amount of 0.01 to 10 mol %, or 0.05 to 5 mol %, or 0.1 to 4 mol %, or 0.1 to 3 mol % to achieve increased branching. Under these conditions, it is possible that both branched and unbranched polyimides are formed, to provide a polyimide composition comprising the branched polyimides and a second polyimide that is not the same as the branched polyimide. This second polyimide is generally an unbranched polyimide that comprises more than 1, for example 5 to 1000, or 5 to 500, or 10 to 100, structural units of formula (11)

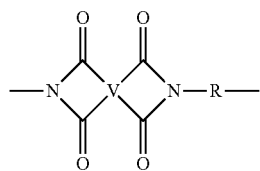

(11)

wherein V and R are as described in formula (1) and (1'). It is also possible to combine the branched polyimide or polyimide composition with a second polyimide that is separately manufactured, and contains a different degree of branching or no branching, to obtain the polyimide composition. In an embodiment, the polyimide composition includes 1 to 99 wt %, or 10 to 90 wt %, or 0.1 to 20 wt %, or 0.5 to 10 wt %, or 1 to 5 wt % of a branched polyimide and 99 to 1 wt %, or 90 to 10 wt %, or 99.9 to 80 wt %, or 99.5 to 90 wt %, or 99 to 95 wt % of a second polyimide.

Similarly, both branched and unbranched polyetherimides can be formed, to provide a polyetherimide composition comprising the branched polyetherimides (1a) or (1a') and a second polyetherimide that is not the same as the branched polyetherimides. This second polyetherimide is generally an unbranched polyetherimide that comprises more than 1, for example 5 to 1000, or 5 to 500, or 10 to 100, structural units of formula (12)

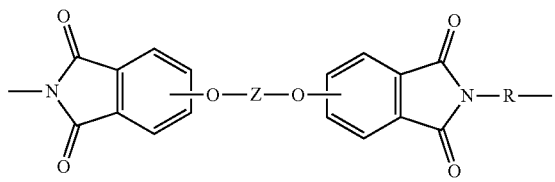

(12)

wherein Z and R are as described in formula (1a) and (1 a'). In an embodiment, the polyetherimide composition includes 1 to 99 wt %, or 10 to 90 wt %, or 0.1 to 20 wt %, or 0.5 to 10 wt %, or 1 to 5 wt % of a branched polyetherimide (1a) or (1a') and 99 to 1 wt %, or 90 to 10 wt %, 99.9 to 80 wt %, or 99.5 to 90 wt %, or 99 to 95 wt % of a second polyetherimide.

It is also possible to combine the polyimide or polyimide composition with a second polymer that is not the same as the branched polyimide to provide a polymer composition. Such polymer compositions can include 1 to 99 wt % of the polyimide and 1 to 99 wt % of the second polymer, or 10 to 90% of the polyimide and 10 to 90 wt % of the second polymer.

Illustrative examples of second polymers include a polyacetal, poly($C_{1-6}$ alkyl)acrylate, polyacrylamide, polyacrylonitrile, polyamide, polyamideimide, polyanhydride, polyarylene ether, polyarylene ether ketone, polyarylene ketone, polyarylene sulfide, polyarylene sulfone, polybenzothiazole, polybenzoxazole, polybenzimidazole, polycarbonate, polyester, poly($C_{1-6}$ alkyl)methacrylate, polymethacrylamide, cyclic olefin polymer, polyolefin, polyoxadiazole, polyoxymethylene, polyphthalide, polysilazane, polysiloxane, polystyrene, polysulfide, polysulfonamide, polysulfonate, polythioester, polytriazine, polyurea, polyurethane, vinyl polymer, or a combination comprising at least one of the foregoing.

The branched polyimide, the polyimide composition, and the polymer composition can include various additives ordinarily incorporated into compositions of this type, with the proviso that any additive is selected so as to not significantly adversely affect the desired properties of the composition. Exemplary additives include antioxidants, thermal stabilizers, light stabilizers, ultraviolet light (UV) absorbing additives, quenchers, plasticizers, lubricants, mold release agents, antistatic agents, visual effect additives such as dyes, pigments, and light effect additives, flame resistances, anti-drip agents, and radiation stabilizers. Combinations of additives can be used. The foregoing additives can be present individually in an amount from 0.005 to 10 wt %, or combined in an amount from 0.005 to 20 wt %, specifically 0.01 to 10 wt %, based on the total weight of the composition. Particulate fillers and reinforcing fillers can also be present.

Also provided herein is an article including the branched polyimide, the polyimide composition, or the polymer composition. A wide variety of articles can manufactured using the branched polyimide, the polyimide composition, and the polymer composition, for example articles of utility in automotive, telecommunication, aerospace, electrical/electronics, transportation, and healthcare applications. Such articles can include coatings, fibers, matrices for polymer composites, and the like. The articles can be extruded or molded, for example injection molded. Components for electronic devices and components for sterilizable medical articles can be specifically mentioned. Thin-wall components manufactured by injection molding can also be specifically mentioned, such as a wall having a thickness from 0.1 to 10 millimeters (mm), or 0.2 to 5 mm, or 0.5 to 2 mm. These compositions are especially advantageous when manufacturing articles need improved flame retardance properties.

In a particular embodiment, the article is a thin-walled component, an injection molded article, a thermoformed article, a spun fiber, a foam, or an additive for large format manufacturing.

In embodiments, the article is a thin-walled component, wherein the branched polyimide has a $M_w$ of 30,000 to 40,000 g/mol, preferably 31,000 to 39,000 g/mol, more preferably 33,000 to 39,000 g/mol, wherein G is present in an amount of 0.3 to 0.5 mol %, the rheology ratio is 1.1 to 1.5, and the strain hardening ratio is 1.1 to 1.5; or the branched polyimide has a $M_w$ of 40,100 to 52,000 g/mol, preferably 41,000 to 49,000 g/mol, more preferably 42,000 to 48,000 g/mol, wherein G is present in an amount of 2 to 3 mol %, the rheology ratio is 2.5 to 3, and the strain hardening ratio is 4.5 to 5; or the branched polyimide has a $M_w$ 52,100 to 68,000 g/mol, preferably 53,000 to 67,000 g/mol, more preferably 54,000 to 66,000 g/mol, wherein G is present in an amount of 2 to 3 mol %, the rheology ratio is 3 to 4, and the strain hardening ratio is 5 to 6.

In embodiments, the article is a thermoformed article, wherein the branched polyimide has a $M_w$ of 30,000 to 40,000 g/mol, preferably 31,000 to 39,000 g/mol, more preferably 33,000 to 39,000 g/mol, wherein G is present in an amount of 0.5 to 2 mol %, the rheology ratio is 1.3 to 1.7, and the strain hardening ratio is 1.5 to 2.5; or the branched polyimide has a $M_w$ of 40,100 to 52,000 g/mol, preferably 41,000 to 49,000 g/mol, more preferably 42,000 to 48,000 g/mol, wherein G is present in an amount of 0.3 to 0.5 mol %, the rheology ratio is 1.5 to 2.5, and the strain hardening ratio is 3 to 4; or the branched polyimide has a $M_w$ 52,100 to 68,000 g/mol, preferably 53,000 to 67,000 g/mol, more preferably 54,000 to 66,000 g/mol, wherein G is present in an amount of 0.5 to 2 mol %, the rheology ratio is 2.5 to 4, and the strain hardening ratio is 4 to 6.

In embodiments, the article is a spun fiber, wherein the branched polyimide has a $M_w$ of 30,000 to 40,000 g/mol, preferably 31,000 to 39,000 g/mol, more preferably 33,000 to 39,000 g/mol, wherein G is present in an amount of 2 to 3 mol %, the rheology ratio is 1.6 to 2, and the strain hardening ratio is 2.5 to 3; or the branched polyimide has a $M_w$ of 40,100 to 52,000 g/mol, preferably 41,000 to 49,000 g/mol, more preferably 42,000 to 48,000 g/mol, wherein G is present in an amount of 0.5 to 2 mol %, the rheology ratio is 2 to 2.5, and the strain hardening ratio is 4 to 5; or the branched polyimide has a $M_w$ 52,100 to 68,000 g/mol, preferably 53,000 to 67,000 g/mol, more preferably 54,000 to 66,000 g/mol, wherein G is present in an amount of 2 to 3 mol %, the rheology ratio is 3 to 4, and the strain hardening ratio is 5 to 6.

In embodiments, the article is a foam, wherein the branched polyimide has a $M_w$ of 30,000 to 40,000 g/mol, preferably 31,000 to 39,000 g/mol, more preferably 33,000 to 39,000 g/mol, wherein G is present in an amount of 2 to 3 mol %, the rheology ratio is 1.6 to 2, and the strain hardening ratio is 2.5 to 3; or the branched polyimide has a $M_w$ of 40,100 to 52,000 g/mol, preferably 41,000 to 49,000 g/mol, more preferably 42,000 to 48,000 g/mol, wherein G is present in an amount of 0.5 to 2 mol %, the rheology ratio is 2 to 2.5, and the strain hardening ratio is 4 to 5; or the branched polyimide has a $M_w$ 52,100 to 68,000 g/mol, preferably 53,000 to 67,000 g/mol, more preferably 54,000 to 66,000 g/mol, wherein G is present in an amount of 0.5 to 2 mol %, the rheology ratio is 2.5 to 4, and the strain hardening ratio is 4 to 6.

In embodiments, the article is an additive, wherein the branched polyimide has a $M_w$ of 30,000 to 40,000 g/mol, preferably 31,000 to 39,000 g/mol, more preferably 33,000 to 39,000 g/mol, wherein G is present in an amount of 0.5 to 2 mol %, the rheology ratio is 1.3 to 1.7, and the strain hardening ratio is 1.5 to 2.5; or the branched polyimide has a $M_w$ of 40,100 to 52,000 g/mol, preferably 41,000 to 49,000 g/mol, more preferably 42,000 to 48,000 g/mol, wherein G is present in an amount of 0.3 to 0.5 mol %, the rheology ratio is 1.5 to 2.5, and the strain hardening ratio is 3 to 4; or the branched polyimide has a $M_w$ 52,100 to 68,000 g/mol, preferably 53,000 to 67,000 g/mol, more preferably 54,000 to 66,000 g/mol, wherein G is present in an amount of 0.3 to 0.5 mol %, the rheology ratio is 2 to 4, and the strain hardening ratio is 3 to 6.

The branched polyimides are further illustrated by the following non-limiting examples.

EXAMPLES

Table 1 lists components that are used in the examples. Unless specifically indicated otherwise, the amount of each component is in weight percent in the following examples, based on the total weight of the composition.

TABLE 1

| Component | Description |
|---|---|
| mPD | m-Phenylene diamine (Sigma-Aldrich) |
| PA | Phthalic anhydride (SABIC) |
| TAPE | 1,1,1-Tris[4-(4-aminophenoxy)phenyl]ethane (SABIC) |
| oDCB | o-Dicholorobenzene (Sigma-Aldrich) |
| BPA—DA | 2,2-Bis[4-(3,4dicarboxyphenoxy)phenyl]propane dianhydride (4,4'-Bisphenol A dianhydride) (SABIC) |
| PEI-38k | Linear polyetherimide, $M_w$ = 41,396 g/mol absolute (SABIC) |
| PEI-33k | Linear polyetherimide, $M_w$ = 33,483 g/mol absolute (SABIC) |
| BPEI-1 | Polyetherimide made from bisphenol A dianhydride and m-phenylene diamine with phthalic anhydride endcap and 0.3 mol % 1,1,1-tris[4-(4-aminophenoxy)phenyl]ethane (TAPE), $M_w$ = 47,933 g/mol absolute (SABIC) |
| BPEI-2 | Polyetherimide made from bisphenol A dianhydride and m-phenylene diamine with phthalic anhydride endcap and 1.5 mol % TAPE, $M_w$ = 43,637 g/mol absolute (SABIC) |
| BPEI-3 | Polyetherimide made from bisphenol A dianhydride and m-phenylene diamine with phthalic anhydride endcap and 0.3 mol % TAPE, $M_w$ = 38,706 g/mol absolute (SABIC) |
| BPEI-4 | Polyetherimide made from bisphenol A dianhydride and m-phenylene diamine with phthalic anhydride endcap and 1.5 mol % TAPE, $M_w$ = 39,250 g/mol absolute (SABIC) |

Physical testing of the compositions was conducted according to the following test methods and procedures. Unless indicated otherwise, all test standards set forth herein are the test standards in effect as of 2016.

Weight average molecular weight ($M_w$) was measured by gel permeation chromatography (GPC, EcoSECHLC-8320, Tosoh Bioscience) equipped with a Wyatt MiniDAWN TREOS multi-angle light scattering detector, a differential refractive index detector (DRI), and a UV detector. The PEIs were dissolved in DMF, and the flow rate was 0.5 mL min$^{-1}$. The column set consisting of a SuperH-H guard column (4.6 mm ID×3.5 cm, 4 μm), a SuperH-H guard column (6.0 mm ID×15 cm, 4 μm), and two SuperH-H guard columns (6.0 mm ID×15 cm, 4 μm) carried out the separation. Both the detectors and columns were maintained at 30° C. $M_w$ was determined by a triple point detector.

Differential scanning calorimetry (DSC) was performed under a nitrogen flush of 50 mL/min at a heating rate of 10° C./min on a TA instruments Q1000 DSC, which was calibrated using indium (melting point, m.p.=156.60° C.) and zinc (m.p.=419.47° C.) standards. Glass transition temperature ($T_g$) was measured as the midpoint of the transition in the second heating ramp.

Tensile tests were performed on an Instron 5500R at a cross-head speed of 5 mm/min at 23° C., according to ASTM D638. The maximum elongation was averaged over five specimens.

Melt rheological studies were performed on an AR-G2 rheometer (TA Instruments) and two 25-mm-diameter parallel plates were used. Melt flow rate (MFR) was determined at 337° C., 6.7 kg load, and a dwell time of 360 seconds according to ASTM D1238-10.

Vicat softening temperature was measured on an injection molded sample having the dimensions 40 mm×10 mm×3.2 mm (length×width×thickness) at a heating rate of 50° C./hour with a load of 50 N, in accordance with ASTM D1525.

Notched Izod impact strength (NII), Un-notched Izod impact strengths (UNI), and Reverse Notched Izod impact strengths (RNI) were determined at 23° C., 3.18 mm bars, and a pendulum energy of 6.78 N·m, in accordance with ASTM 256-10.

Average branch molecular weight was determined by size exclusion chromatography (SEC). Chloroform size exclusion chromatography (SEC) provided absolute molecular weights using a Waters 1515 Isocratic HPLC Pump and Waters 717plus Autosampler with Waters 2414 refractive index and Wyatt MiniDAWN MALS detectors (flow rate 1.0 mL min$^{-1}$).

Polydispersity (PDI) was determined by size exclusion chromatography-multiple angle light scattering SEC-MALS in chloroform using dn/dc=0.271 or determined by GPC using polystyrene standards (or a triple-point detector).

Gel permeation chromatography (GPC) was performed using a triple detector on an ALLIANCE GPCV2000 instrument (Waters Corp.) set at 145° C. The flow rate for the GPC is 1 mL/min. The injection volume is 218.5 µL. The column set consists of four, Mixed-A columns (20-µm particles; 7.5×300 mm; Polymer Laboratories Ltd).

Shear rheological measurements were conducted using an ARES G2 rheometer (TA Instruments) with a parallel plate geometry (25 mm and 8 mm) and a gap of 1 mm. All sample loading and testing were done under an N2 atmosphere to limit sample degradation. Frequency sweeps were done from 245 to 360° C. using a frequency range of 0.3 to 300 rad/s. A dynamic strain adjustment was used in all frequency sweeps to maintain a specified torque range during the changing frequencies to avoid nonlinear response. For tests run at 245° C., the 8 mm plate geometry was used. The master curves were obtained using time-temperature superposition (TTS), which was found to be valid for all the samples that were investigated. The Cox-Merz rule was applied to convert the complex viscosity versus angular frequency curves to viscosity versus shear rate curves.

Extensional rheology measurements to determine strain hardening were performed on the ARES G2 rheometer (TA Instruments) using an extensional viscosity fixture (EVF) geometry. Samples for extensional viscosity testing were prepared in a hydraulic press at 320° C. using a developed method to prevent bubble formation. Sample geometry was approximately 18×10×0.7 mm. Tests were run at 300° C. using stretch rates from 0.5 to 8 1/s. A prestretch (5×10$^{-3}$ 1/s) was used to orient the samples according to EVF methods.

Flammability testing for flame retardancy was conducted according to UL 94 regulations. The total flame-out-time was calculated at a thickness of 1.5 mm. For a sample that meets V-2, burning stops within 30 seconds on a vertical specimen; drips of flaming particles are allowed. For a sample that meets V-1, burning stops within 30 seconds on a vertical specimen; drips of particles allowed as long as they are not inflamed. For samples that meet V-0, burning stops within 10 seconds on a vertical specimen; drips of particles allowed as long as they are not inflamed.

Sample Preparation

Processing of the polyetherimides (PEIs) was carried out in a laboratory scale helicone mixer (4CV Helicone mixer, Design Integrated Technology, Inc.). The helicone mixer was equipped with twin opposing helical blades with 270-degree twist, constructed of Alloy 2205 with 16 g polish finish. The blade speed can be varied from 1 to 65 revolutions per minute (rpm). The helical blades were driven by a 7.5 HP Constant Torque Inverter Duty Motor. The bowl is double intersecting cone-type equipped with electric bronze heaters. The interior of the mix chamber was constructed of 316 SST with 16 g polish finish. A nitrogen purge and a vacuum system were available to regulate the pressure of the helicone mixer from atmospheric pressure to full vacuum.

Helicone batches were formulated as follows. As an example, a branched PEI having a target $M_w$ of 38,000 g/mol and 0.3 mole percent (mol %) branching agent was prepare as follows: 670.41 g of mPD and 7.21 g of TAPE were premixed in 4.5 kg of o-DCB to give a homogeneous solution. The helicone mixer was charged with 3,200 g of BPA-DA and 41.56 g PA and dissolved in 4.5 kg of o-DCB to give a homogeneous solution at 50° C. A homogeneous mixture of 670.41 g of mPD and TAPE in o-DCB at 50° C. was added slowly to the stirred mixture. The reaction is agitated and heated at 180° C. for three hours. A sample was periodically taken to adjust stoichiometry as needed. After three hours, the system pressure was reduced to 0.3 Torr (0.0399 kilopascal) and the temperature was ramped to 350° C. to remove the solvent. The vacuum was then discharged and the molten polymer was taken out from the bottom of the reactor. The solid pieces of polymer were allowed to cool using ambient air and then ground into small particles for injection molding.

Additional branched PEIs were prepared by adjusting the amounts of BPA-DA, PA, mPD, and TAPE, to provide the desired target weight average molecular weights with a target percent branching agent. As used herein, the mole percent of the branching agent means the amount of amines present in the formulation that are derived from the branching agent, based on the total amount of amines in the formulation.

Samples were prepared by injection molding of the branched PEIs and control PEIs. Molding was performed on a 180 ton injection molding machine at a barrel temperature of 690 to 710° C.

The branched PEIs (BPEI-1 to BPEI-4) had the respective absolute molecular weights ($M_w$ and $M_n$), polydispersity (PDI), rheological properties, melt properties, and physical properties as shown in Table 2. Linear PEIs (PEI-38k and PEI-33k) are also shown for comparison.

TABLE 2

| Property | Unit | PEI-38k | BPEI-1 | BPEI-2 | PEI-33k | BPEI-3 | BPEI-4 |
|---|---|---|---|---|---|---|---|
| Target $M_w$ | — | 38 k | 38 k | 38 k | 33 k | 33 k | 33 k |
| Branching Agent | mol % | 0 | 0.3 | 1.5 | 0 | 0.3 | 1.5 |
| $M_w$ | g/mol | 41396 | 47933 | 43637 | 33483 | 38706 | 39250 |
| $M_n$ | g/mol | 18920 | 14240 | 14399 | 16699 | 15487 | 13262 |
| $M_w/M_n$ | — | 3.030 | 3.366 | 4.631 | 2.453 | 4.504 | 2.499 |
| Zero shear | Pa · s | 2039 | 7924 | 4963 | 730 | 808 | 1025 |
| Rheology ratio | — | 1.35 | 2.05 | 2.03 | 1.14 | 1.32 | 1.47 |
| MFR (337° C.) | g/10 min | 8 | 6.1 | 12 | 18 | 13 | 19 |
| Apparent viscosity† | Pa · s | 623 | 935 | 603 | 392 | 631 | 387 |
| Viscosity change‡ | % | −7 | 139 | 270 | −8 | 168 | 586 |
| Elongation at Break | % | 95 | 16 | 11 | 72 | 11 | 9 |
| Notched Izod | J/m | 41 | 39 | 32 | 28 | 28 | 25 |
| Unnotched Izod | J/m | 1490 | 1710 | 1530 | 1700 | 1210 | 1050 |
| Reverse Notched Izod | J/m | 1170 | 1070 | 976 | 970 | 759 | 713 |
| $T_g$ (DSC) | ° C. | 217 | 219 | 215 | 217 | 218 | 216 |
| Vicat | ° C. | 213 | 211 | 210 | 211 | 208 | 208 |
| UL-94 rating (1.5 mm) | — | V-0 | V-0 | V-0 | V-0 | V-0 | V-0 |

†Apparent viscosity as measured at a shear rate of 640/s.
‡Viscosity change after 1,800 seconds at 400° C. and a shear rate of 640/s.

Figure 2:
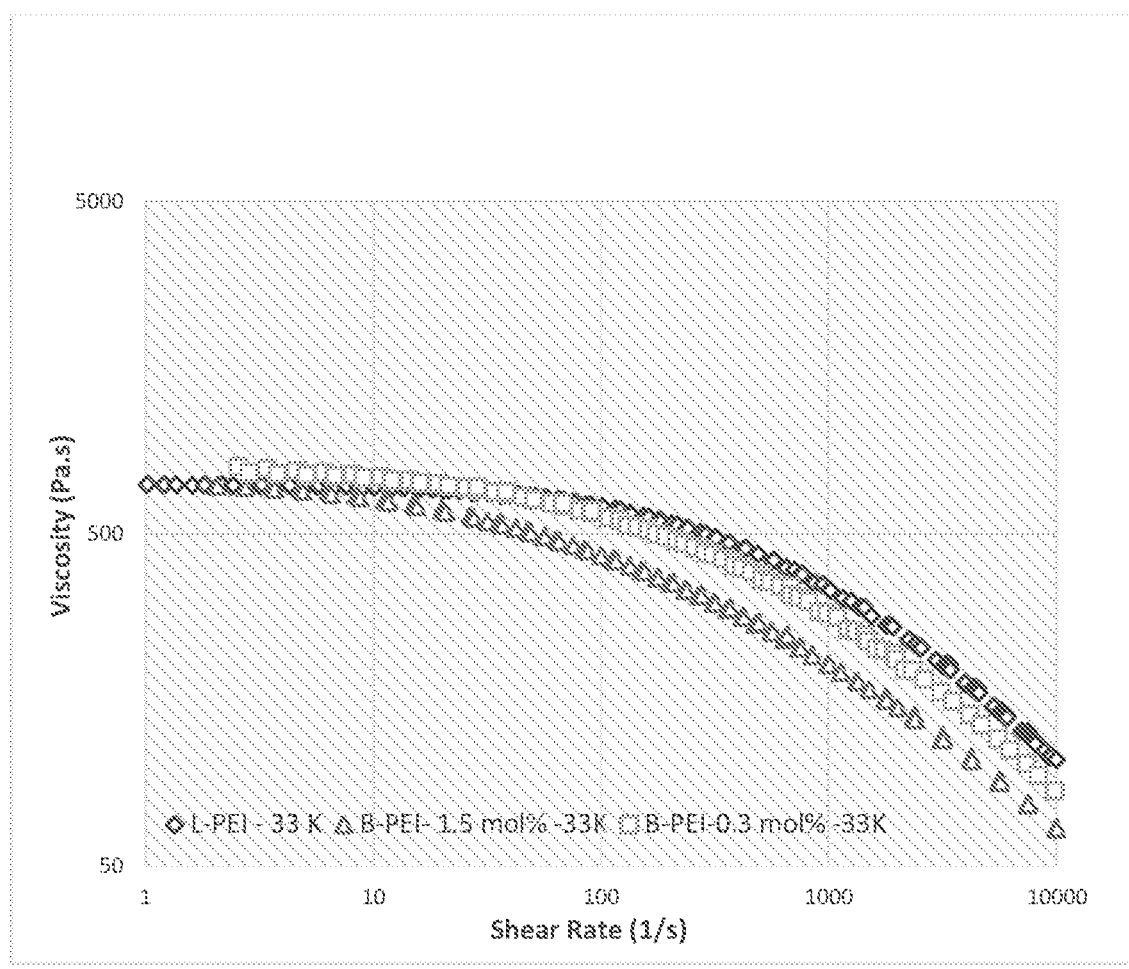
FIG. 2 is a graph of viscosity (Pa·s) versus shear rate (1/s) for PEI oligomers according to embodiments.

The effect of shear rate on the viscosity of the branched PEIs is illustrated in FIGS. 1 and 2. FIG. 1 compares the viscosities of the linear PEI-38k to the branched BPEI-1 and BPEI-3 samples. FIG. 2 compares the viscosities of the linear PEI-33k to the branched BPEI-3 and BPEI-4 samples. The observed decrease in apparent viscosities for the 1.5 mol % branching samples BPEI-2 and BPEI-4 can be attributed to the difference in entanglement density (difference in branch length) which is a function of absolute $M_w$ and branching concentration.

The samples all had UL94 ratings of V-0, showing that the flame retardance was not diminished by branching in the PEIs. While performing the flame retardance tests, it was noted that the shape of the bottom of the flame bar was different depending on the amount of branching in the sample. Increasing amounts of branching produced less deformation or melt flow near the bottom of the flame bar. It is expected that this type of behavior could have significant effects for flame testing of articles that incorporate the branched PEIs.

The increase in branching agent can cause an earlier and increased shear thinning behavior, which is the trend observed for PEI-33k, BPEI-3, and BPEI-4. For BPEI-1 and BPEI-3, the samples showed a dramatic increase in shear thinning compared to PEI-38k. BPEI-1 also showed a lower viscosity compared to BPEI-2 at processing shear rates 650 to 5,000 1/s, possibly from an increase in short chain branch formation on already formed branches. The processing shear rate of 650 l/s was representative of extrusion and 5,000 l/s was representative of injection molding. The observed formation of additional branching on already formed branches results in a number of shorter branched chains that are not long enough to entangle themselves as observed in long chain branching. That is, there is an increase in the overall branch frequency, but the amount of actual long chain branching does not increase. The significant shift in the calculated values of entanglement molecular weight for BPEI-3 may explain this observation (Table 3).

The entanglement molecular weight ($M_e$) is calculated by Equation 1

$$M_e = \rho RT/G_N^0 \qquad \text{(Equation 1)}$$

wherein ρ is the polymer density at temperature T, R is the ideal gas constant, and $G_N^0$ is the plateau modulus. The plateau modulus is calculated from the van Gurp Palmen plot (i.e., the plot of phase angle (δ) vs complex modulus (G*)). $G_N^0$ is calculated from the complex modulus value at the minimum of the van Gurp Palmen plot.

To further understand the shear rate dependence of viscosity, a generalized Carreau model was fitted to the viscosity curves. The Carreau model fits well for all the branched samples. The Carreau model is defined by Equation 2

$$\eta = \eta_0[1 + (\lambda\gamma)^\alpha]^{\frac{n-1}{\alpha}} \qquad \text{(Equation 2)}$$

wherein $\eta_0$ is the zero shear viscosity, λ is the relaxation time in milliseconds, α is the transition breadth parameter, and n is the power law index that characterizes the degree of shear thinning. The data obtained for the Carreau model, the rheology ratio, and entanglement weight (grams per mole, g/mol) for the oligomers are provided in Table 3.

TABLE 3

| | $\eta_0$ (Pa · s) | λ (ms) | n | Rheology Ratio | $M_e$ (g/mol) |
|---|---|---|---|---|---|
| PEI-38k | 2039 | 0.94 | 0.55 | 1.35 | 2,700 |
| PEI-33k | 730 | 0.70 | 0.66 | 1.14 | 2,600 |
| BPEI-1 | 7924 | 2.71 | 0.30 | 2.05 | 2,820 |
| BPEI-2 | 4963 | 1.50 | 0.66 | 2.03 | 3,150 |
| BPEI-3 | 808 | 0.58 | 0.50 | 1.32 | 2,920 |
| BPEI-4 | 1025 | 0.41 | 0.36 | 1.47 | 3,100 |

As shown in Table 3, the effect of branching on the shear-thinning was determined by the rheology ratio, which is defined as the ratio of viscosity at the shear rate of 10 l/s to viscosity at a shear rate of 100 l/s. The higher ratios showed better flow properties for a given molecular weight.

While shear rheology can show the presence of long chain branching (LCB), additional information can be obtained by simulating high shear rate processes. Extensional rheology is a more sensitive method of predicting LCB and showing the effects this branching has on elongational flow. Applications such as blow molding, film blowing, thermoforming, etc. often use processes needed particular elongational or extensional flow properties.

Strain hardening can also be a useful property in film blowing or foams, as it may stabilize the film bubble or the free fiber during the melt extension phase due to its strong melt strength. High take up speeds are enhanced with the suitable amount of strain hardening to avoid bubble collapsing and fiber breaking. The extent of the strain hardening can be described by the magnitude or degree of deviation between a material's extensional viscosity data and its shear viscosity data. The extent of the strain hardening is also related to the level of the LCB in the molecules. The stronger the strain hardening, the higher the LCB level is in the molecules.

Figure 3:
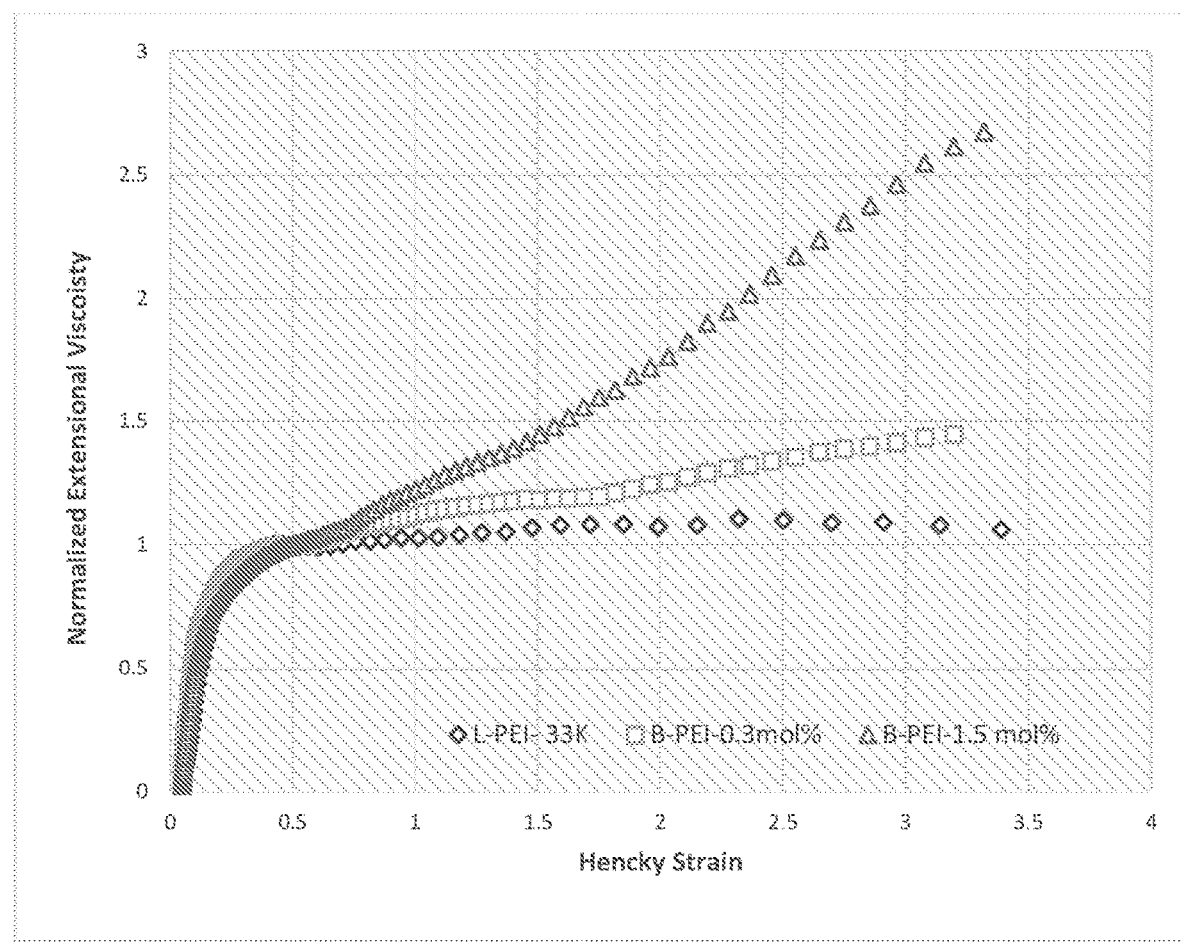
FIG. 3 is a graph of normalize extensional viscosity versus Hencky strain for PEI oligomers according to embodiments.

Strain hardening behavior, as observed by an increase in elongational flow with increase in strain, was found for BPEI-1 to BPEI-4. The extensional viscosity results comparing BPEI-3 and BPEI-4 with PEI-33k are shown in FIG. 3.

This disclosure is further illustrated by the following aspects.

Aspect 1. A branched polyimide of formula (1) or (1') wherein, in the formula, G is a group having a valence of t, present in an amount of 0.01 to 10 mol %, or 0.05 to 5 mol %, or 0.1 to 4 mol %, or 0.1 to 3 mol %, each Q is independently the same or different, and is a divalent $C_{1-60}$ hydrocarbon group, each M is independently the same or different, and is —O—, —C(O)—, —OC(O)—, —OC(O)O—, —NHC(O), —(O)CNH—, —S—, —S(O)—, or —S(O)$_2$—, D is a phenylene, each V is independently the same or different, and is a tetravalent $C_{4-40}$ hydrocarbon group, each R is independently the same or different, and is a $C_{1-20}$ divalent hydrocarbon group, q is 0 or 1, m is 0 or 1, d is 0 or 1, p is 1 or 2, t is 2 to 6, preferably 2 to 4, and each n is independently the same or different, and is 1 to 1,000, preferably 2 to 500, or 3 to 100, provided that the total of all values of n is greater than 4, or greater than 10, or greater than 20, or greater than 50, or greater than 100, or greater than 250, and wherein the branched polyimide has a zero-shear viscosity in a range from 500 to 15,000 Pascal·seconds, preferably 750 to 10,000 Pascal·seconds, more preferably 800 to 8,000 Pascal·seconds, measured at 360° C., a rheology ratio of 1.1 to 5, preferably 1.3 to 4, more preferably 1.5 to 4, wherein the rheology ratio is the ratio of viscosity at a shear rate of 10/s to viscosity at a shear rate of 100/s, measured at 360° C., and a strain hardening ratio of 1 to 6, preferably 1.1 to 5, more preferably 1.5 to 4, wherein the strain hardening ratio is the ratio of extensional viscosity at a Hencky strain of 3 to extensional viscosity at a Hencky strain of 0.5, measured at 300° C. and a strain rate of 2/s.

Aspect 2. The branched polyimide of aspect 1, wherein the branched polyimide has a weight average molecular weight of 30,000 to 40,000 grams per mole, preferably 31,000 to 39,000 grams per mole, more preferably 33,000 to 39,000 grams per mole, wherein G is present in an amount of 0.3 to 0.5 mole percent, the rheology ratio is 1.1 to 1.5, and the strain hardening ratio is 1.1 to 1.5; or G is present in an amount of 0.5 to 2 mole percent, the rheology ratio is 1.3 to 1.7, and the strain hardening ratio is 1.5 to 2.5; or G is present in an amount of 2 to 3 mole percent, the rheology ratio is 1.6 to 2, and the strain hardening ratio is 2.5 to 3.

Aspect 3. The branched polyimide of aspect 1, wherein the branched polyimide has a weight average molecular weight of 40,100 to 52,000 grams per mole, preferably 41,000 to 49,000 grams per mole, more preferably 42,000 to 48,000 grams per mole, wherein G is present in an amount of 0.3 to 0.5 mole percent, the rheology ratio is 1.5 to 2.5, and the strain hardening ratio is 3 to 4; or G is present in an amount of 0.5 to 2 mole percent, the rheology ratio is 2 to 2.5, and the strain hardening ratio is 4 to 5; or G is present in an amount of 2 to 3 mole percent, the rheology ratio is 2.5 to 3, and the strain hardening ratio is 4.5 to 5.

Aspect 4. The branched polyimide of aspect 1, wherein the branched polyimide has a weight average molecular weight of 52,100 to 68,000 grams per mole, preferably 53,000 to 67,000 grams per mole, more preferably 54,000 to 66,000 grams per mole, wherein G is present in an amount of 0.3 to 0.5 mole percent, the rheology ratio is 2 to 4, and the strain hardening ratio is 3 to 6; or G is present in an amount of 0.5 to 2 mole percent, the rheology ratio is 2.5 to 4, and the strain hardening ratio is 4 to 6; or G is present in an amount of 2 to 3 mole percent, the rheology ratio is 3 to 4, and the strain hardening ratio is 5 to 6.

Aspect 5. The branched polyimide of any one or more of aspects 1 to 4, wherein the branched polyimide has at least one of: a melt flow rate of 2 to 25 grams per 10 minutes, preferably 5 to 20 grams per 10 minutes, more preferably 10 to 20 grams per 10 minutes, measured at 337° C. according to ASTM D1238-10; a glass transition temperature of greater than 100° C., preferably 100 to 395° C., more preferably 180 to 280° C., even more preferably 200 to 250° C., as determined by differential scanning calorimetry; or a viscosity increase of 25 to 1,000%, preferably 75 to 1,000%, more preferably 100 to 1,000% after 1800 seconds, measured at 400° C. and a shear rate of 640/s; or an apparent viscosity of 350 to 1,200 Pascal·seconds, preferably 400 to 1,100 Pascal·seconds, more preferably 500 to 1,000 Pascal at a shear rate of 640/s; or a tensile elongation at break of greater than 8%, preferably greater than 9%, more preferably greater than 10%, measured at 23° C. according to ASTM D638; or a notched Izod impact strength of at least 25 Joules per meter, preferably at least 30 Joules per meter, more preferably at least 32 Joules per meter, measured at 23° C. according to ASTM D256-10; or an unnotched Izod impact strength of at least 1,000 Joules per meter, preferably at least 1,100 Joules per meter, more preferably at least 1,200 Joules per meter, measured at 23° C. according to ASTM D256-10; or a reverse notched Izod impact strength of at least 600 Joules per meter, preferably at least 700 Joules per meter, more preferably at least 800 Joules per meter, measured at 23° C. according to ASTM D256-10.

Aspect 6. The branched polyimide of any one or more of aspects 1 to 5, wherein when t is 2, G is —O—, —C(O)—, —OC(O)—, —(O)CO—, —NHC(O), —(O)CNH—, —S—, —S(O)—, —S(O)$_2$—, or —P(R$^a$)(O)— wherein R$^a$ is a $C_{1-8}$ alkyl or $C_{6-12}$ aryl; or when t is 3, G is a nitrogen, phosphorus, or pentavalent P(O); or G is a $C_{1-60}$ hydrocarbon group having a valence of t.

Aspect 7. The branched polyimide of any one or more of aspects 1 to 6, wherein G is —O— when m is 0, pentavalent P(O), a $C_{6-50}$ hydrocarbon having at least one aromatic group, a $C_{2-20}$ aliphatic group, a $C_{4-8}$ cycloaliphatic group, a $C_{3-12}$ heteroarylene, or a polymer moiety.

Aspect 8. The branched polyimide of any one or more of aspects 1 to 7, wherein V is a group of formula (2) wherein W is —O—, —S—, —C(O)—, —SO$_2$—, —SO—, —P(R$^a$)(=O)— wherein R$^a$ is a $C_{1-8}$ alkyl or $C_{6-12}$ aryl, —C$_y$H$_{2y}$— wherein y is an integer from 1 to 5 or a halogenated derivative thereof, or a group of the formula —O—Z—O— wherein Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing, provided that the valence of Z is not exceeded.

Aspect 9. The branched polyimide of any one or more of aspects 1 to 8, wherein the branched polyimide is a branched polyetherimide of formula (1a) or (1a'), wherein each Z is independently an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing, provided that the valence of Z is not exceeded.

Aspect 10. The branched polyimide of aspect 9, wherein Z is a divalent group of formula (4a), wherein J is —O—, —S—, —C(O)—, —SO$_2$—, —SO—, or —C$_y$H$_{2y}$— wherein y is an integer from 1 to 5 or a halogenated derivative thereof, preferably isopropylidene; and R is m-phenylene, p-phenylene, bis(4,4'-phenylene)sulfone, bis (3,4'-phenylene)sulfone, or bis(3,3'-phenylene)sulfone.

Aspect 11. A method for the manufacture of the branched polyimide of any one or more of aspects 1 to 10, the method comprising reacting a polyamine of formula (5) or (5') and a diamine of formula (7) with a dianhydride of formula (6) in a solvent and under conditions effective to provide the branched polyimide, wherein G, Q, M, D, R, V, q, m, d, p, and t are as defined in any one or more of aspects 1 to 10.

Aspect 12. The method of aspect 11, further comprising pre-dissolving the polyamine and the diamine in a first portion of the solvent to form a first mixture; pre-dissolving the dianhydride in a second portion of the solvent to form a second mixture; and combining the first mixture and the second mixture.

Aspect 13. A method for the manufacture of the branched polyimide of any one or more of aspects 1 to 10, wherein the branched polyimide is a branched polyetherimide, the method comprising: reacting a polyamine of formula (5) or (5') and a diamine of formula (7) with an anhydride of the formula, and a dianhydride of the formula (6) or (6a) in a solvent and under conditions effective to provide the branched polyetherimide, wherein G, Q, M, D, R, V, q, m, d, p, and t are as defined in any one or more of aspects 1 to 10.

Aspect 14. The method of any one or more of aspects 11 to 13, wherein the polyamine is of the formula (5k).

Aspect 15. An article comprising the branched polyimide of any one or more of aspects 1 to 10, or made by any one or more of the method of aspect 11 or 14.

Aspect 16. A polymer composition comprising: the polyimide of any one or more of aspects 1 to 10, or made by the method of any one or more of aspects 11 or 14; and a second polymer different from the branched polyimide.

Aspect 17. The polymer composition of aspect 16, wherein the second polymer is a polyacetal, poly(C$_{1-6}$ alkyl)acrylate, polyacrylamide, polyacrylonitrile, polyamide, polyamideimide, polyanhydride, polyarylene ether, polyarylene ether ketone, polyarylene ketone, polyarylene sulfide, polyarylene sulfone, polybenzothiazole, polybenzoxazole, polybenzimidazole, polycarbonate, polyester, polyetherimide, polyimide, poly(C$_{1-6}$ alkyl)methacrylate, polymethacrylamide, cyclic olefin polymer, polyolefin, polyoxadiazole, polyoxymethylene, polyphthalide, polysilazane, polysiloxane, polystyrene, polysulfide, polysulfonamide, polysulfonate, polythioester, polytriazine, polyurea, polyurethane, vinyl polymer, or a combination thereof.

Aspect 18. An article comprising the polymer composition of aspect 16 or 17.

Aspect 19. The article of aspect 18, wherein the article is a thin-walled component, an injection molded article, a thermoformed article, a spun fiber, a foam, or an additive for large format manufacturing.

Aspect 20. The article of aspect 18 or 19, wherein the article is the thin-walled component, wherein the branched polyimide is the branched polyimide of aspect 2, wherein G is present in an amount of 0.3 to 0.5 mole percent; or the branched polyimide of aspect 3 or 4, wherein G is present in an amount of 2 to 3 mole percent; or the thermoformed article, wherein the branched polyimide is the branched polyimide of aspect 2 or 4, wherein G is present in an amount of 0.5 to 2 mole percent; or the branched polyimide of aspect 3, wherein G is present in an amount of 0.3 to 0.5 mole percent; or the spun fiber, wherein the branched polyimide is the branched polyimide of aspect 2 or 4, wherein G is present in an amount of 2 to 3 mole percent; or the branched polyimide of aspect 3, wherein G is present in an amount of 0.5 to 2 mole percent; or the foam, wherein the branched polyimide is the branched polyimide of aspect 2, wherein G is present in an amount of 2 to 3 mole percent; or the branched polyimide of aspect 3 or 4, wherein G is present in an amount of 0.5 to 2 mole percent; or the additive, wherein the branched polyimide is the branched polyimide of aspect 2, wherein G is present in an amount of 0.5 to 2 mole percent; or the branched polyimide of aspect 3 or 4, wherein G is present in an amount of 0.3 to 0.5 mole percent.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles.

The singular forms "a," "an," and "the" include plural referents unless the context clearly dictates otherwise. "Or" means "and/or" unless clearly indicated otherwise by context. The endpoints of all ranges directed to the same component or property are inclusive and independently combinable. Disclosure of a narrower range or more specific group in addition to a broader range is not a disclaimer of the broader range or larger group. "Combination thereof as used herein means that a combination comprising one or more of the listed items, optionally with one or more like items not listed.

Unless defined otherwise, technical and scientific terms used herein have the same meaning as is commonly understood by one of skill in the art to which this disclosure belongs. A "combination" is inclusive of blends, mixtures, alloys, reaction products, and the like.

As used herein, an unattached line, e.g., "O—" indicates a bond, not a methyl group, which is indicated by "—CH$_3$". The term "hydrocarbyl" and "hydrocarbon" refers broadly to a group comprising carbon and hydrogen, optionally with 1 to 3 heteroatoms, for example, oxygen, nitrogen, halogen, silicon, sulfur, or a combination thereof; the term "aliphatic" means a branched or unbranched, saturated or unsaturated group containing carbon and hydrogen, optionally with 1 to 3 heteroatoms, for example, oxygen, nitrogen, halogen, silicon, sulfur, or a combination thereof; the term "cycloaliphatic" means a saturated or unsaturated group comprising carbon and hydrogen optionally with 1 to 3 heteroatoms, for example, oxygen, nitrogen, halogen, silicon, sulfur, or a combination thereof; "alkyl" means a straight or branched chain, saturated monovalent hydrocarbon group; "alkylene" means a straight or branched chain, saturated, divalent hydrocarbon group; "alkylidene" means a straight or branched chain, saturated divalent hydrocarbon group, with both valences on a single common carbon atom; "alkenyl" means a straight or branched chain monovalent hydrocarbon group having at least two carbons joined by a carbon-carbon double bond; "cycloalkyl" means a non-aromatic monovalent monocyclic or multicyclic hydrocarbon group having at least three carbon atoms, "cycloalkenyl" means a nonaromatic cyclic divalent hydrocarbon group having at least three carbon atoms, with at least one degree of unsaturation; "aryl" and "arylene" means a monovalent group and divalent group respectively containing at least one aromatic ring and optionally a nonaromatic ring, and having only carbon in the ring or rings; "alkylarylene" means an aryl group that has been substituted with an alkyl group as defined above, with 4-methylphenyl being an exemplary alkylarylene group; "arylalkylene" means an alkyl group that has been substituted with an aryl group as defined above, with benzyl being an exemplary arylalkylene group; "heteroaryl" and "heteroarylene" means a monovalent group and divalent group respectively wherein at least one carbon in a ring is replaced by a heteroatom (S, O, P, or N); "acyl" means an alkyl group as defined above with the indicated number of carbon atoms attached through a carbonyl carbon bridge (—C(=O)—); "alkoxy" means an alkyl group as defined above with the indicated number of carbon atoms attached through an oxygen bridge (—O—); and "aryloxy" means an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents or variables are permissible provided that the substitutions do not significantly adversely affect synthesis or use of the compound. Exemplary groups that can be present on a "substituted" position include, but are not limited to, cyano; hydroxyl; nitro; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxys; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; amino di($C_{1-6}$ or $C_{1-3}$)alkyl; $C_{6-12}$ aryl having at least one aromatic rings (e.g., phenyl, biphenyl, naphthyl, or the like); $C_{7-19}$ arylalkylene having 1 to 3 separate or fused rings and from 6 to 18 ring carbon atoms; or $C_{7-19}$ arylalkyleneoxy having 1 to 3 separate or fused rings and from 6 to 18 ring carbon atoms, with benzyloxy being an exemplary arylalkyleneoxy. When a group is substituted, the indicated number of carbon atoms includes the substituent.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A branched polyimide of the formula

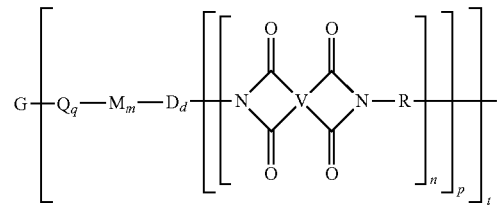

wherein, in the formula,
G is a group having a valence of t, present in an amount of 0.01 to 10 mol %,
each Q is independently the same or different, and is a divalent $C_{1-60}$ hydrocarbon group,
each M is independently the same or different, and is —O—, —C(O)—, —OC(O)—, —OC(O)O—, —NHC(O), —(O)CNH—, —S—, —S(O)—, or —S(O)$_2$—,
D is a phenylene,
each V is independently the same or different, and is a tetravalent $C_{4-40}$ hydrocarbon group,
each R is independently the same or different, and is a $C_{1-20}$ divalent hydrocarbon group,
q is 0 or 1, m is 0 or 1, d is 0 or 1, p is 1 or 2, t is 2 to 6, and
each n is independently the same or different, and is 1 to 1,000, provided that the total of all values of n is greater than 4, and wherein the branched polyimide has
a zero-shear viscosity in a range from 500 to 15,000 Pascal·seconds, measured at 360° C.,
a rheology ratio of 1.1 to 5, wherein the rheology ratio is the ratio of viscosity at a shear rate of 10/s to viscosity at a shear rate of 100/s, measured at 360° C., and
a strain hardening ratio of 1 to 6, wherein the strain hardening ratio is the ratio of extensional viscosity at a Hencky strain of 3 to extensional viscosity at a Hencky strain of 0.5, measured at 300° C. and a strain rate of 2/s.

2. The branched polyimide of claim 1, wherein the branched polyimide has
a weight average molecular weight of 30,000 to 40,000 grams per mole, as measured by gel permeation chromatography using a triple point detector, wherein
G is present in an amount of 0.3 to 0.5 mole percent, the rheology ratio is 1.1 to 1.5, and the strain hardening ratio is 1.1 to 1.5; or
G is present in an amount of 0.5 to 2 mole percent, the rheology ratio is 1.3 to 1.7, and the strain hardening ratio is 1.5 to 2.5; or
G is present in an amount of 2 to 3 mole percent, the rheology ratio is 1.6 to 2, and the strain hardening ratio is 2.5 to 3.

3. The branched polyimide of claim 1, wherein the branched polyimide has
a weight average molecular weight of 40,100 to 52,000 grams per mole, as measured by gel permeation chromatography using a triple point detector, wherein
G is present in an amount of 0.3 to 0.5 mole percent, the rheology ratio is 1.5 to 2.5, and the strain hardening ratio is 3 to 4; or G is present in an amount of 0.5 to 2 mole percent, the rheology ratio is 2 to 2.5, and the strain hardening ratio is 4 to 5; or G is present in an amount of 2 to 3 mole percent, the rheology ratio is 2.5 to 3, and the strain hardening ratio is 4.5 to 5.

4. The branched polyimide of claim 1, wherein the branched polyimide has a weight average molecular weight of 52,100 to 68,000 grams per mole, as measured by gel permeation chromatography using a triple point detector, wherein G is present in an amount of 0.3 to 0.5 mole percent, the rheology ratio is 2 to 4, and the strain hardening ratio is 3 to 6; or G is present in an amount of 0.5 to 2 mole percent, the rheology ratio is 2.5 to 4, and the strain hardening ratio is 4 to 6; or G is present in an amount of 2 to 3 mole percent, the rheology ratio is 3 to 4, and the strain hardening ratio is 5 to 6.

5. The branched polyimide of claim 1, wherein the branched polyimide has at least one of:

a melt flow rate of 2 to 25 grams per 10 minutes, measured at 337° C. according to ASTM D1238-10; or a glass transition temperature of greater than 100° C., as determined by differential scanning calorimetry; or a viscosity increase of 25 to 1,000%, measured at 400° C. and a shear rate of 640/s; or an apparent viscosity of 350 to 1,200 Pascal·seconds, at a shear rate of 640/s; or a tensile elongation at break of greater than 8%, measured at 23° C. according to ASTM D638; or a notched Izod impact strength of at least 25 Joules per meter, measured at 23° C. according to ASTM D256-10; or an unnotched Izod impact strength of at least 1,000 Joules per meter, measured at 23° C. according to ASTM D256-10; or a reverse notched Izod impact strength of at least 600 Joules per meter, measured at 23° C. according to ASTM D256-10.

6. The branched polyimide of claim 1, wherein V is a group of the formula

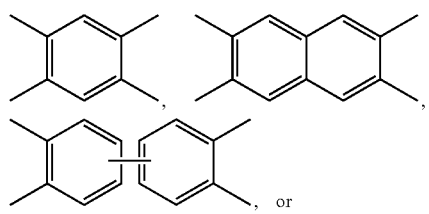

, or

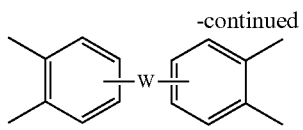

wherein W is —O—, —S—, —C(O)—, —SO$_2$—, —SO—, —P(R$^a$)(=O)—wherein R$^a$ is a C$_{1-8}$ alkyl or C$_{6-12}$ aryl, —C$_y$H$_{2y}$-wherein y is an integer from 1 to 5 or a halogenated derivative thereof, or a group of the formula —O—Z—O— wherein Z is an aromatic C$_{6-24}$ monocyclic or polycyclic moiety optionally substituted with 1 to 6 C$_{1-8}$ alkyl groups, 1 to 8 halogen atoms, or a combination thereof, provided that the valence of Z is not exceeded.

7. The branched polyimide of claim 1, wherein the branched polyimide is a branched polyetherimide of the formula

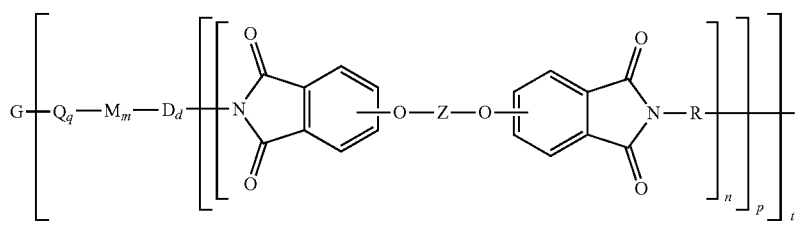

wherein each Z is independently an aromatic C$_{6-24}$ monocyclic or polycyclic moiety optionally substituted with 1 to 6 C$_{1-8}$ alkyl groups, 1 to 8 halogen atoms, or a combination thereof, provided that the valence of Z is not exceeded.

8. The branched polyimide of claim 7, wherein Z is a divalent group of the formula

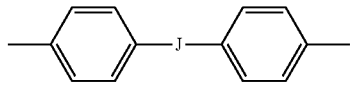

wherein J is —O—, —S—, —C(O)—, —SO$_2$—, —SO—, or —C$_y$H$_{2y}$-wherein y is an integer from 1 to 5 or a halogenated derivative thereof; and R is m-phenylene, p-phenylene, bis(4,4'-phenylene)sulfone, bis(3,4'-phenylene)sulfone, or bis(3,3'-phenylene)sulfone.

9. A method for the manufacture of the branched polyimide of claim 1, the method comprising reacting a polyamine of the formula

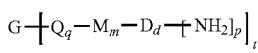

and a diamine of the formula

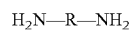

with either
a dianhydride of the formula

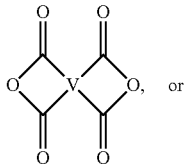, or an anhydride of the formula

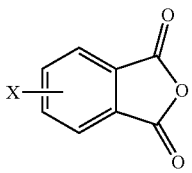

in a solvent and under conditions effective to provide the branched polyimide, wherein G, Q, M, D, R, V, q, m, d, p, and t are as defined in claim 1, and wherein X is a nitro group or halogen.

10. The method of claim 9, further comprising
pre-dissolving the polyamine and the diamine in a first portion of the solvent to form a first mixture;
pre-dissolving the dianhydride in a second portion of the solvent to form a second mixture; and
combining the first mixture and the second mixture.

11. The method of claim 9, wherein the branched polyimide is a branched polyetherimide, and the method comprises:
reacting
the polyamine of the formula

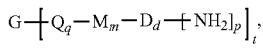

and the diamine of the formula

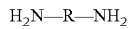

with the anhydride of the formula

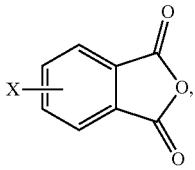

wherein X is a nitro group or halogen, to provide intermediate bis(phthalimide)s of the formulas

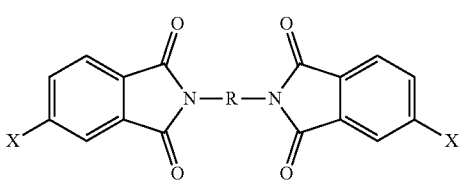 and

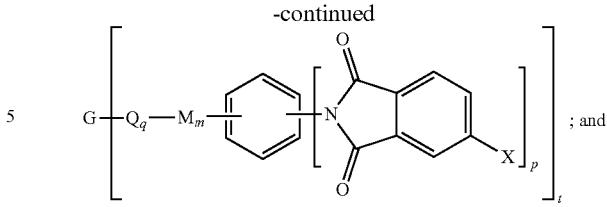; and reacting the bis(phthalimide)s with an alkali metal salt of a dihydroxy aromatic compound having the formula

wherein AM is an alkali metal, to provide the branched polyetherimide, wherein G, Q, M, D, R, V, Z, q, m, d, p, and t are as defined in claim 1.

12. The method of claim 9, wherein the polyamine is of the formula

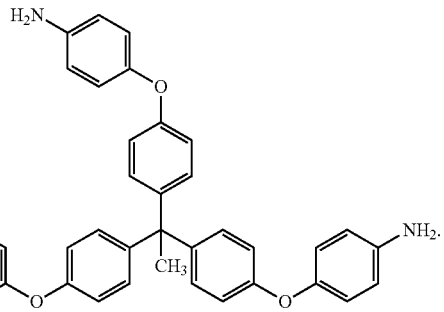

13. An article comprising a polymer composition, wherein the polymer composition comprises the branched polyimide of claim 1; and a second polymer different from the branched polyimide.

14. The article of claim 13, wherein the second polymer is a polyacetal, poly($C_{1-6}$ alkyl)acrylate, polyacrylamide, polyacrylonitrile, polyamide, polyamideimide, polyanhydride, polyarylene ether, polyarylene ether ketone, polyarylene ketone, polyarylene sulfide, polyarylene sulfone, polybenzothiazole, polybenzoxazole, polybenzimidazole, polycarbonate, polyester, polyetherimide, polyimide, poly($C_{1-6}$ alkyl)methacrylate, polymethacrylamide, cyclic olefin polymer, polyolefin, polyoxadiazole, polyoxymethylene, polyphthalide, polysilazane, polysiloxane, polystyrene, polysulfide, polysulfonamide, polysulfonate, polythioester, polytriazine, polyurea, polyurethane, vinyl polymer, or a combination thereof.

15. The article of claim 13, wherein the article is a thin-walled component,
wherein the branched polyimide has
a weight average molecular weight of 30,000 to 40,000 grams per mole, as measured by gel permeation chromatography using a triple point detector, G is present in an amount of 0.3 to 0.5 mole percent, the rheology ratio is 1.1 to 1.5, and the strain hardening ratio is 1.1 to 1.5; or
a weight average molecular weight of 40,100 to 52,000 grams per mole, as measured by gel permeation chromatography using a triple point detector, G is present in an amount of 2 to 3 mole percent, the rheology ratio is 2.5 to 3, and the strain hardening ratio is 4.5 to 5; or
a weight average molecular weight of 52,100 to 68,000 grams per mole, as measured by gel permeation chromatography using a triple point detector, G is present in an amount of 2 to 3 mole percent, the rheology ratio is 3 to 4, and the strain hardening ratio is 5 to 6.

16. The article of claim 13, wherein the article is a thermoformed article,
wherein the branched polyimide has
a weight average molecular weight of 30,000 to 40,000 grams per mole, as measured by gel permeation chromatography using a triple point detector, G is present in an amount of 0.5 to 2 mole percent, the rheology ratio is 1.3 to 1.7, and the strain hardening ratio is 1.5 to 2.5; or
a weight average molecular weight of 52,100 to 68,000 grams per mole, as measured by gel permeation chromatography using a triple point detector, G is present in an amount of 0.5 to 2 mole percent, the rheology ratio is 2.5 to 4, and the strain hardening ratio is 4 to 6; or
a weight average molecular weight of 40,100 to 52,000 grams per mole, as measured by gel permeation chromatography using a triple point detector, G is present in an amount of 0.3 to 0.5 mole percent, the rheology ratio is 1.5 to 2.5, and the strain hardening ratio is 3 to 4.

17. The article of claim 13, wherein the article is a spun fiber, wherein the branched polyimide has
a weight average molecular weight of 30,000 to 40,000 grams per mole, as measured by gel permeation chromatography using a triple point detector, G is present in an amount of 2 to 3 mole percent, the rheology ratio is 1.6 to 2, and the strain hardening ratio is 2.5 to 3; or
a weight average molecular weight of 52,100 to 68,000 grams per mole, as measured by gel permeation chromatography using a triple point detector, G is present in an amount of 2 to 3 mole percent, the rheology ratio is 3 to 4, and the strain hardening ratio is 5 to 6; or
a weight average molecular weight of 40,100 to 52,000 grams per mole, as measured by gel permeation chromatography using a triple point detector, G is present in an amount of 0.5 to 2 mole percent, the rheology ratio is 2 to 2.5, and the strain hardening ratio is 4 to 5.

18. The article of claim 13, wherein the article is a foam, wherein the branched polyimide has
a weight average molecular weight of 30,000 to 40,000 grams per mole, as measured by gel permeation chromatography using a triple point detector, G is present in an amount of 2 to 3 mole percent, the rheology ratio is 1.6 to 2, and the strain hardening ratio is 2.5 to 3; or
a weight average molecular weight of 40,100 to 52,000 grams per mole, as measured by gel permeation chromatography using a triple point detector, G is present in an amount of 0.5 to 2 mole percent, the rheology ratio is 2 to 2.5, and the strain hardening ratio is 4 to 5; or
a weight average molecular weight of 52,100 to 68,000 grams per mole, as measured by gel permeation chromatography using a triple point detector, G is present in an amount of 0.5 to 2 mole percent, the rheology ratio is 2.5 to 4, and the strain hardening ratio is 4 to 6.

19. The article of claim 13, wherein the article is a foam, wherein the branched polyimide has
a weight average molecular weight of 30,000 to 40,000 grams per mole, as measured by gel permeation chromatography using a triple point detector, G is present in an amount of 2 to 3 mole percent, the rheology ratio is 1.6 to 2, and the strain hardening ratio is 2.5 to 3; or
a weight average molecular weight of 40,100 to 52,000 grams per mole, as measured by gel permeation chromatography using a triple point detector, G is present in an amount of 0.5 to 2 mole percent, the rheology ratio is 2 to 2.5, and the strain hardening ratio is 4 to 5; or
a weight average molecular weight of 52,100 to 68,000 grams per mole, as measured by gel permeation chromatography using a triple point detector, G is present in an amount of 0.5 to 2 mole percent, the rheology ratio is 2.5 to 4, and the strain hardening ratio is 4 to 6.

20. The article of claim 13, wherein the article is an additive for large format manufacturing, wherein the branched polyimide has
a weight average molecular weight of 30,000 to 40,000 grams per mole, as measured by gel permeation chromatography using a triple point detector, G is present in an amount of 0.5 to 2 mole percent, the rheology ratio is 1.3 to 1.7, and the strain hardening ratio is 1.5 to 2.5; or
a weight average molecular weight of 40,100 to 52,000 grams per mole, as measured by gel permeation chromatography using a triple point detector, G is present in an amount of 0.3 to 0.5 mole percent, the rheology ratio is 1.5 to 2.5, and the strain hardening ratio is 3 to 4; or
a weight average molecular weight of 52,100 to 68,000 grams per mole, as measured by gel permeation chromatography using a triple point detector, G is present in an amount of 0.3 to 0.5 mole percent, the rheology ratio is 2 to 4, and the strain hardening ratio is 3 to 6.

* * * * *